United States Patent
Inami et al.

(10) Patent No.: US 9,152,810 B2
(45) Date of Patent: Oct. 6, 2015

(54) INFORMATION OUTPUT SYSTEM, METHOD, AND PROGRAM FOR TAMPERING DETECTION

(75) Inventors: Yasuharu Inami, Kahoku (JP); Mutsumu Nagashima, Kahoku (JP)

(73) Assignee: PFU LIMITED, Kahoku-shi (JP)

(*) Notice: Subject to any disclaimer, the term of this patent is extended or adjusted under 35 U.S.C. 154(b) by 1003 days.

(21) Appl. No.: 12/496,191

(22) Filed: Jul. 1, 2009

(65) Prior Publication Data
US 2010/0046753 A1    Feb. 25, 2010

(30) Foreign Application Priority Data

Aug. 25, 2008 (JP) ................................. 2008-215669

(51) Int. Cl.
| | |
|---|---|
| G06F 21/60 | (2013.01) |
| G06F 21/62 | (2013.01) |
| H04N 1/32 | (2006.01) |
| H04N 1/44 | (2006.01) |

(52) U.S. Cl.
CPC ........ *G06F 21/6209* (2013.01); *H04N 1/32133* (2013.01); *H04N 1/444* (2013.01); *H04N 1/4413* (2013.01); *H04N 1/4426* (2013.01); *H04N 1/4486* (2013.01); *H04N 2201/3281* (2013.01)

(58) Field of Classification Search
CPC ... H04N 1/444; H04N 1/4486; G06F 21/6209
USPC ....................... 726/26; 382/100; 380/243, 51
See application file for complete search history.

(56) References Cited

U.S. PATENT DOCUMENTS

| | | | | |
|---|---|---|---|---|
| 6,567,530 | B1* | 5/2003 | Keronen et al. | 382/100 |
| 7,421,581 | B2* | 9/2008 | Alasia et al. | 713/168 |
| 7,440,143 | B2* | 10/2008 | Suzaki | 358/3.28 |
| 2002/0041705 | A1* | 4/2002 | Lin et al. | 382/165 |
| 2003/0202680 | A1* | 10/2003 | Hayashi | 382/100 |
| 2004/0170274 | A1* | 9/2004 | Machida et al. | 380/46 |
| 2007/0076874 | A1* | 4/2007 | Suleiman et al. | 380/243 |

FOREIGN PATENT DOCUMENTS

| | | |
|---|---|---|
| JP | 2001-309157 A | 11/2001 |
| JP | 2002-109113 A | 4/2002 |
| JP | 2003-209676 A | 7/2003 |

(Continued)

OTHER PUBLICATIONS

Fridrich et al.; New fragile authentication watermark for images; Published in: Image Processing, 2000. Proceedings. 2000 International Conference on (vol. 1 ); Date of Conference: 2000; pp. 446-449 vol. 1; IEEE Xplore.*

(Continued)

*Primary Examiner* — Bradley Holder
(74) *Attorney, Agent, or Firm* — Westerman, Hattori, Daniels & Adrian, LLP

(57) ABSTRACT

An information output system for tampering detection 100, including: a digital image acquiring unit 15 for acquiring a digital image including target information for tampering detection as an image; an encrypting unit 11 for converting the digital image based on an encryption key to generate an encrypted image; and an output unit 18 for outputting the encrypted image generated by the encrypting unit 11 so that the encrypted image is recorded on a paper medium on which the image of the target information is to be recorded or on which the image of the target information is recorded.

6 Claims, 32 Drawing Sheets

(56) References Cited

FOREIGN PATENT DOCUMENTS

| | | |
|---|---|---|
| JP | 2003-264685 A | 9/2003 |
| JP | 2004-064327 A | 2/2004 |
| JP | 2005-12530 A | 1/2005 |
| JP | 2005-142969 A | 6/2005 |
| JP | 2006-14189 A | 1/2006 |
| JP | 2007-28324 A | 2/2007 |
| JP | 2007-281539 A | 10/2007 |

OTHER PUBLICATIONS

Wu et al.; A secure semi-fragile watermarking for image authentication based on integer wavelet transform with parameters; Published in: Proceeding ACSW Frontiers '05 Proceedings of the 2005 Australasian workshop on Grid computing and e-research—vol. 44; 2005; pp. 75-80; ACM Digital Library.*

Notice of Reason for Rejection dated Feb. 28, 2012, issued in corresponding Japanese Application No. 2008-215669.

* cited by examiner

TRIANGULAR MICRO AREA

MICRO AREAS HAVING DIFFERENT SIZES AND SHAPES (A)          (B)

(A)    (B)

FIG. 18
(A)  (B)  (C)  (D)
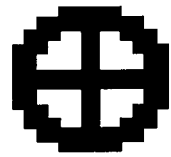 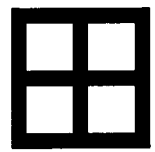 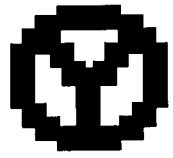 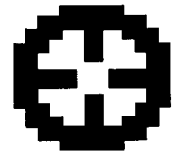

US 9,152,810 B2

INFORMATION OUTPUT SYSTEM, METHOD, AND PROGRAM FOR TAMPERING DETECTION

CROSS-REFERENCE TO RELATED APPLICATION

This application is based upon and claims the benefit of priority of the prior Japanese Patent Application No. 2008-215669, filed on Aug. 25, 2008, the entire contents of which are incorporated herein by reference.

FIELD

The present invention relates to a technology of preventing tampering of a document.

BACKGROUND

As a technology of detecting tampering of a paper document, there is a technology of calculating characteristic data including black pixel density and the like from a document and adding the characteristic data to a margin of the document in a format of a barcode or the like to make it possible to detect, when the document is tampered, the tampering of the document (see Patent document 1). There is also a technology of superimposing and printing dot patterns having regularity to make it possible to detect disorder of the regularity of the dot patterns due to tampering (see Patent document 2). Besides, several technologies of preventing tampering of a document are proposed (see Patent documents 3 to 8).

[Patent document 1] Japanese Laid-open Patent Publication No. 2001-309157 A
[Patent document 2] Japanese Laid-open Patent Publication No. 2005-12530 A
[Patent document 3] Japanese Laid-open Patent Publication No. 2002-109113 A
[Patent document 4] Japanese Laid-open Patent Publication No. 2003-264685 A
[Patent document 5] Japanese Laid-open Patent Publication No. 2003-209676 A
[Patent document 6] Japanese Laid-open Patent Publication No. 2006-14189 A
[Patent document 7] Japanese Laid-open Patent Publication No. 2007-28324 A
[Patent document 8] Japanese Laid-open Patent Publication No. 2007-281539 A

SUMMARY

As described above, conventionally, as a technology of detecting tampering of information recorded on a paper medium, there is a technology of calculating characteristic data of printed information and printing the characteristic data on the same paper medium in a computer-readable format (barcode, etc.) to make it possible to detect presence or absence of tampering.

However, such a tampering detection technology is a technology of comparing characteristic data added to a document for tampering detection with characteristic data calculated based on the document at a point of tampering check to detect presence or absence of tampering. Accordingly, even if it is possible to detect that tampering has been made, content of correct information before the tampering cannot be learned and it is difficult to detect a position where the tampering has been made. Further, the information before the tampering is not left, and thus even if the tampering is detected, it is difficult to confirm that this detection is not misdetection. In particular, in such a technology, an object on which information is recorded is a paper medium, and thus it is likely that a stain or a smudge of printing occur in a portion as a target of tampering detection after the calculation of the characteristic data for tampering detection. Accordingly, there is a risk that, even when tampering has not been made, tampering is misdetected.

As another related art, there is a technology of superimposing and printing an image for tampering detection on an original document. However, in such a method, identity with the original document is spoiled, and moreover, if separation of the original document and the image superimposed for tampering detection fails when detection of tampering is performed, it is likely that tampering cannot be detected or misdetection occurs.

It is an object of the present invention to provide, in view of the problems, a system that can detect tampering of information recorded on a paper medium while making it possible to grasp a tampering place and tampering content.

In order to solve the problems, the present invention adopts the following means. That is, the present invention provides an information output system for tampering detection, comprising: digital image acquiring means for acquiring a digital image including target information for tampering detection as an image; encrypting means for converting the digital image based on an encryption key to generate an encrypted image; and encrypted image output means for outputting the encrypted image generated by the encrypting means so that the encrypted image is recorded on a paper medium on which the image of the target information is to be recorded or on which the image is recorded.

Herein, the target information is information set as a target of detection concerning whether tampering is committed among kinds of information recorded on the paper medium (in general, recorded by means of printing or the like). As such information, for example, there is information included in a document acquired from a person who provides some kind of certification and thereafter submitted to another person (e.g., a certificate such as a certificate of residence or a certificate of seal impression, or a prescription). However, in addition to the information described above, information in which a user desires to detect tampering among kinds of information recorded on a paper medium can be target information of tampering detection.

The digital image is an image as a set of pixels, such as so-called bitmap data. The information output system for tampering detection according to the present invention converts at least a partial area in the digital image and generates an encrypted image including an encrypted converted area according to a method of, for example, performing processing for dividing the digital image into blocks and rearranging the blocks, adjustment of pixel information, and the like.

Like the digital image, a data form of the encrypted image generated by the encrypting means is a set of pixels. An encryption key is used for encryption (conversion). By performing the conversion using the encryption key, when a decryption key corresponding to this encryption key is used, it is possible to obtain a correct decryption result. As an encryption system, there are mainly systems of common key encryption and asymmetrical key encryption (public key encryption). When the common key encryption system is used, an encryption key and a decryption key are the same.

In the present invention, the generated encrypted image is recorded on a paper medium. This paper medium is a paper medium on which an image of target information, which is a target of tampering detection, is recorded. Therefore, a user who acquires this paper medium can learn presence or absence of tampering and, when tampering is committed, content of the tampering by decrypting the encrypted image using correct key information (the decryption key) and comparing a decryption result and the target information (a portion in which content that may originally be certified is described in a certificate or the like). The tampering detection may be detection by visual check of the user or may be mechanical detection performed by comparing a decrypted image and an image of the target information captured by using a scanner or the like.

The image of the target information and the encrypted image only have to be recorded on the same paper medium at the time when the certificate or the like is completed. In other words, any one of the image of the target information and the encrypted image may be recorded on the paper medium earlier, or the image of the target information and the encrypted image may be simultaneously recorded.

The information output system for tampering detection according to the present invention may further comprise target information output means for outputting, simultaneously with the output of the encrypted image by the encrypted image output means, the image of the target information as a target of tampering detection so that the image is recorded in the paper medium. Accordingly, means for performing recording on the paper medium, such as a user terminal or a printer, can simultaneously acquire the target information as a target of tampering detection and the encryption information for tampering detection from the information output system for tampering detection according to the present invention.

Further, the target information output means may output the image of the target information so that the image is recorded on one side of the paper medium, and the encrypted image output means may output the encrypted image so that the encrypted image is recorded on another side of the paper medium. Accordingly, it is possible to add a function for tampering detection to the certificate by additionally printing the encrypted image for tampering detection on the back side of the certificate without changing a layout and described information of a document or the like for certification conventionally issued. However, a recording position of the encrypted image is not limited to an opposite side of a side on which the target information is recorded. For example, the recording position of the encrypted image may be a margin (portion in which the target information is not recorded) on the same side as that of the target information.

The image of the target information for tampering detection may be an image generated in processing different from that for the digital image generated for encryption (specifically, a layout, a data format, and the like of information may be different). However, the image of the target information and the digital image may be the same image information. That is, the information output system for tampering detection according to the present invention may further comprise electronic data acquiring means for receiving input of electronic data including the target information, wherein: the digital image acquiring means may generate the digital image based on the electronic data to acquire the digital image; and the target information output means may output the digital image as the image of the target information recorded on the paper medium.

Herein, the electronic data refers to data including some kind of information such as a document, a diagram, and an illustration. Those electronic data are created as electronic files by, for example, a document creation application, a spreadsheet application, and an illustration creation application. The digital image acquiring means generates an image in displaying or printing the electronic data as a digital image (e.g., bitmap data) as a set of pixels.

Accordingly, it is possible to easily generate an encrypted image based on electronic data including target information for tampering detection and create a document attached with a tampering detecting function without causing trouble for the user, such as converting electronic data including information desired to be encrypted into a digital image.

The information output system for tampering detection according to the present invention may store the encryption key (and the decryption key) in association with identification information by which the document can be identified. The identification information is recorded on the paper medium on which the encrypted image is recorded. Accordingly, it is possible to acquire an appropriate decryption key based on the identification information, decrypt the encrypted image, and check tampering of the document. It is preferable that the key information (encryption key and decryption key) managed in this system be managed so that people other than a system administrator cannot learn the key information. In decryption, the identification information may be acquired by, for example, detecting at least any of a character, a sign, a pattern, and a color included in the encrypted image from the image. More specifically, there is a method of acquiring the identification information from a barcode, a character string, a sign, or the like of the image.

Further, the encrypting means may convert an image of at least a partial area of the digital image based on the encryption key to a processed image and regularly convert a pixel value of the processed image to generate a converted image having regularity used for specifying a position of the partial area in decryption and generate the encrypted image including the converted image. Accordingly, it is possible to specify, in decryption for tampering detection, an area in the encrypted image, which is actually converted by using the encryption key, irrespective of designation or the like by the user.

Further, the present invention can also be grasped as an information output system for tampering detection, which includes means for detecting whether or not tampering has been made on a paper medium created by using the system. That is, the present invention provides an information output system for tampering detection, comprising: encrypted image acquiring means for acquiring, from a paper medium on which an image of target information for tampering detection and an encrypted image generated by encrypting a digital image including the target information are recorded, the encrypted image; decrypting means for decrypting the encrypted image based on a decryption key corresponding to an encryption key used for generation of the encrypted image to generate a decrypted digital image including the target information; and digital image output means for outputting the decrypted digital image generated by the decrypting means so that the decrypted digital image can be compared with the image of the target information recorded on the paper medium.

According to the information output system for tampering detection of the present invention, it is possible to compare the decrypted digital image with the target information and detect presence or absence of tampering and, when tampering has been made, a position and content of the tampering by decrypting the encrypted image recorded on the same paper medium as that of the target information for tampering detection and outputting the encrypted image.

Further, the present invention can also be grasped as a method executed by a computer or a program making a computer to function as the respective kinds of means described above. Further, the present invention may be such a program recorded in a recording medium readable by the computer, other apparatuses, machines, and the like. Herein, the recording medium readable by the computer and the like refers to a recording medium in which information such as data and programs can be accumulated by an electric, magnetic, optical, mechanical, or chemical action and read from the computer and the like.

According to the present invention, it is possible to provide a system that can detect tampering of information recorded on a paper medium while making it possible to grasp a tampering place and tampering content.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 18 is a diagram showing an example of a positioning marker used for the encrypting process.

DESCRIPTION OF EMBODIMENTS

An embodiment of the present invention is described with reference to the drawings.

Figure 1:
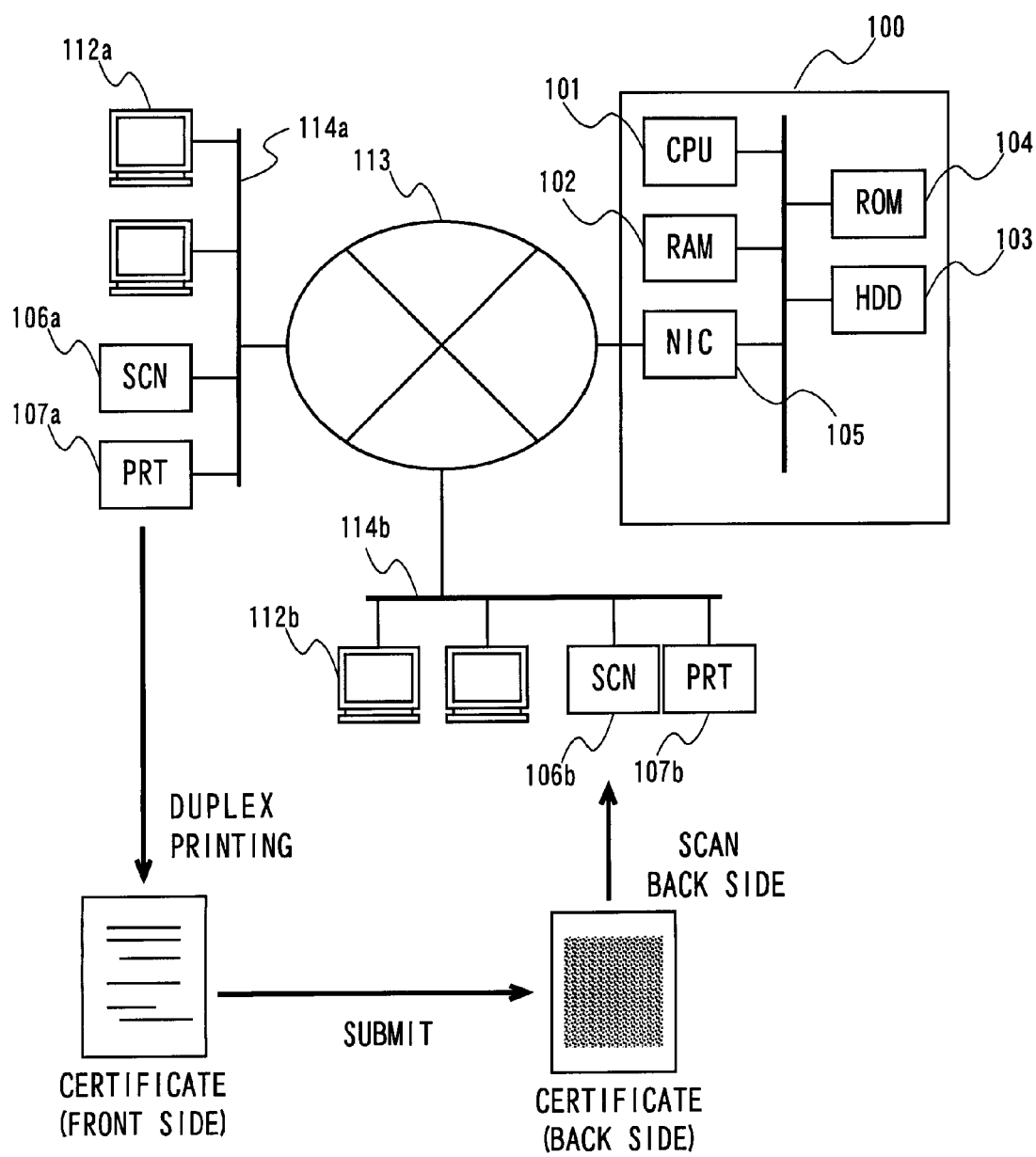
FIG. 1 is a diagram illustrating an overview of a hardware configuration of an information output system for tampering detection according to the embodiment.

FIG. 1 is a diagram illustrating an overview of a hardware configuration of an information output system for tampering detection according to the embodiment. An information output system for tampering detection 100 is a computer including a central processing unit (CPU) 101, a main storage device such as a random access memory (RAM) 102, an auxiliary storage device such as a hard disk drive (HDD) 103, a read only memory (ROM) 104, and a network interface card (NIC) 105. User terminals 112a and 112b including a display device such as a display and input devices such as a mouse and a keyboard are connected to the NIC 105 via a wide area network 113 such as the Internet. The user terminals 112a and 112b are computers having a configuration substantially similar to that of the information output system for tampering detection 100 in terms of hardware.

In this embodiment, the user terminals 112a and 112b respectively belong to different local area networks (LANs) 114a and 114b. Scanners 106a and 106b and printers 107a and 107b usable from the user terminals 112a and 112b are connected to the LANs 114a and 114b, respectively. The information output system for tampering detection 100 according to this embodiment is a system that issues a certificate (e.g., a certificate of residence) to a user who uses the user terminal 112a belonging to the LAN 114a (the user who receives the issuance of the certificate prints the certificate from the user terminal 112a using the printer 107a) and provides, in a submission destination (e.g., a driver's license center) to which the certificate issued in this way is submitted, an image for tampering check for performing tampering check for the certification to a user B in the submission destination who uses the user terminal 112b belonging to the LAN 114b.

Figure 2:
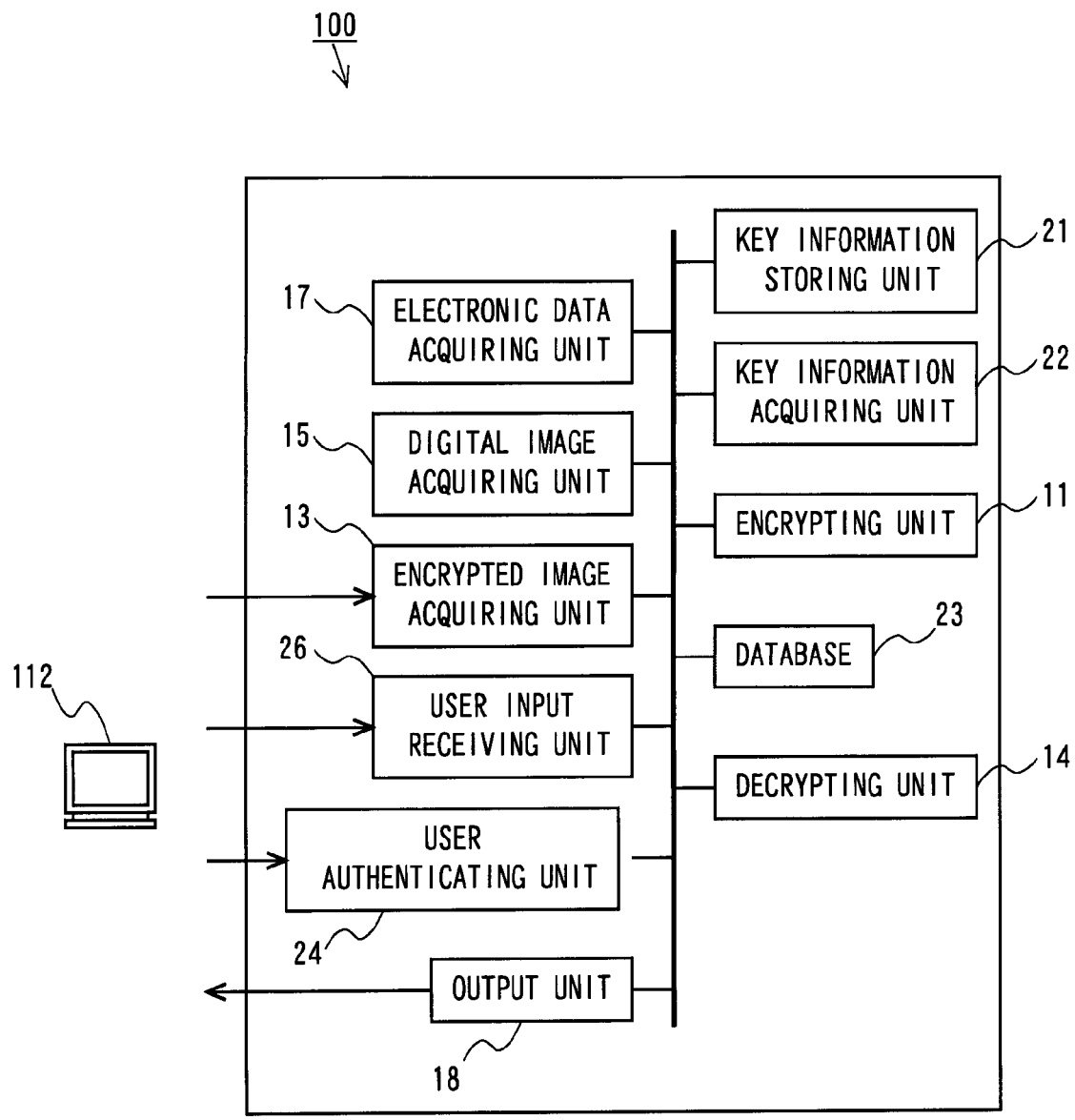
FIG. 2 is a diagram illustrating an overview of a functional configuration of the information output system for tampering detection according to this embodiment.

FIG. 2 is a diagram illustrating an overview of a functional configuration of the information output system for tampering detection 100 according to this embodiment. The computer illustrated in FIG. 1 functions as, when the CPU 101 executes an information output program for tampering detection read out from the HDD 103 and expanded in the RAM 102, the information output system for tampering detection 100 including: a user authenticating unit 24; a user input receiving unit 26 that receives a certificate issuance request, an image output request for tampering check, and the like from the user terminals 112a and 112b; a certificate information database 23; an electronic data acquiring unit 17; a digital image acquiring unit 15; an output unit 18 (corresponding to encrypted image output means, target information output means, and digital image output means according to the present invention); a key information storing unit 21; a key information acquiring unit 22; and an encrypting unit 11.

The computer system illustrated in FIG. 1 functions as, when the CPU 101 executes the information output program for tampering detection read out from the HDD 103 and expanded in the RAM 102 in order to decrypt an encrypted image, the information output system for tampering detection 100 further including an encrypted image acquiring unit 13 and a decrypting unit 14. The respective functional units such as the user authenticating unit 24, the output unit 18, the key information storing unit 21, and the key information acquiring unit 22 are also used in decryption processing for the encrypted image.

In this embodiment, the system according to the present invention is described as the information output system for tampering detection 100 having functions for both output of print data of a certificate and output of tampering check data of the certificate. However, the information output system for tampering detection 100 according to the present invention may be carried out as an output system for certificate print data having a function of encryption or an output system for tampering check data having a function of decryption.

The electronic data acquiring unit 17 retrieves and acquires electronic data necessary for issuance of a certificate from the certificate information database 23 according to a certificate issuance request input from the user terminal 112a. The certificate information database 23 is a database for accumulating electronic data for certificate creation including content described in the certificate in the HDD 103. For example, when the certificate to be issued is a certificate of residence, a name, an address, and the like of a person described in the certificate of residence are accumulated in the certificate information database 23. In this embodiment, the certificate information database 23 is constructed by using the HDD 113 connected to the information output system for tampering detection 100. However, the certificate information database 23 may be constructed by using a different computer connected to the information output system for tampering detection 100 via a network.

The digital image acquiring unit 15 generates a digital image based on electronic data for a certificate acquired from the certificate information database 23 by the electronic data acquiring unit 17 to acquire a digital image as a target of encryption. In this case, the electronic data is electronic data (electronic document) managed by applications such as a document creation application and a spreadsheet application. The digital image acquiring unit 15 converts an image, which is formed when the electronic data is printed on a paper medium or the like or the electronic data is displayed on a display or the like, into a digital image of a so-called bitmap format. For example, electronic data related to a document usually includes character codes and format information. If the image formed when the electronic data is displayed or printed is generated as an image of the bitmap format, it is possible to perform image encryption on the image by the encrypting unit 11.

The key information storing unit 21 stores the key information (encryption key and decryption key) in a key information table in association with a document ID for identifying the certificate to be issued. An encryption system according to this embodiment is the common key encryption system, and thus the encryption key and the decryption key are the same. Among information accumulated in the key information table, at least the key information is encrypted and only a system administrator is permitted to view the key information in a plain text. In other words, according to this embodiment, the user cannot acquire the key information, whereby it is possible to prevent the user from adding, without permission, an encrypted image for tampering detection to a certificate tampered or falsified by the user.

During encryption processing, the key information acquiring unit 22 generates key information anew to acquire an encryption key used for encryption of a digital image. The generated key information is accumulated in the key information table in association with a document ID. During decryption processing, the key information acquiring unit 22 searches the key information table using a document ID of a document, which is scanned by the scanner 106b and encrypted image thereof is acquired, as a search key to acquire a decryption key associated with a certificate related to the document ID.

The encrypting unit 11 converts at least a partial area (encryption area) of the digital image using the encryption key acquired by the key information acquiring unit 22 to generate an encrypted image including a converted area that can be decrypted by using a decryption key corresponding to this encryption key. When a plurality of encryption areas as targets of encryption are designated in the digital image, the encrypting unit 11 may perform encryption using a different encryption key for each of the areas. Details of the encryption processing by the encrypting unit 11 are described later.

The information output system for tampering detection 100 according to this embodiment converts at least a partial area of the digital image based on the encryption key to generate an encrypted image and decrypts the converted area of the encrypted image based on the decryption key. The area of the encrypted image, which is converted by using the encryption key, is referred to as a converted area. It is possible to designate a plurality of converted areas in a single image and convert the respective converted areas using different kinds of key information.

The converted area may be designated by the user every time a certificate is issued (encryption processing). Alternatively, an area specified in advance may be set as the converted area. For example, only a portion of a certificate, which may be specially prevented from being tampered (e.g., seal written in a seal certificate), may be converted by using the encryption key. If the converted area is designated in advance in this way, it is possible to reduce time and effort of the user during issuance of a certificate of a decided format.

Area designation information for specifying the converted area converted by the encrypting unit 11 may be added to the generated encrypted image together with a document ID. In this case, the area designation information is information including position information or the like for designating the converted area in the digital image. As the information used for designating the converted area, there are position information indicating a position in the digital image, size information, vector information, and the like. The converted area is designated by using any one or more of those kinds of information. For example, in encryption processing described later, position information of three points is used to designate a rectangular converted area. In general, the position information can be represented in a unit such as cm, inch, or pixel using an x axis and a y axis orthogonal to the x axis. Positions from ends of the digital image on the x axis and the y axis may be indicated in a ratio (%) with the width or the length of the digital image as a unit. Besides, for example, a method of allocating numbers to all pixels in the digital image (e.g., allocating serial numbers from a pixel at the upper left to a pixel at the lower right) and specifying positions using the numbers is also conceivable. In the area designation information according to this embodiment, it is possible to specify, concerning electronic data over a plurality of pages, a different converted area for each of the pages by combining page number information and position information in the pages.

The encrypted image acquiring unit 13 acquires an encrypted image transmitted from the user terminal 112b via the network 113. The user terminal 112b takes an image of a predetermined portion of a certificate (in this embodiment, back side of the certificate) using an apparatus that can take an image of the certificate, such as the scanner 106b or a digital camera, to acquire an encrypted image.

The decrypting unit 14 decrypts the converted area in the encrypted image acquired by the encrypted image acquiring unit 13 using the decryption key acquired by the key information acquiring unit 22 to generate a decrypted digital image. Details of decryption processing by the decrypting unit 14 are described later.

The output unit 18 transmits certificate print data including the encrypted image generated by the encrypting unit 11 to the user terminal 112a and transmits the digital image decrypted by the decrypting unit 14 to the user terminal 112b. In this embodiment, the certificate print data is information that may be printed on the front side of a paper medium in printing and indicates content certified by a certificate. The certificate print data is information for printing which includes an image of target information as a target of tampering detection and an encrypted image that may be printed on the back side of the paper medium in printing.

Figure 3:
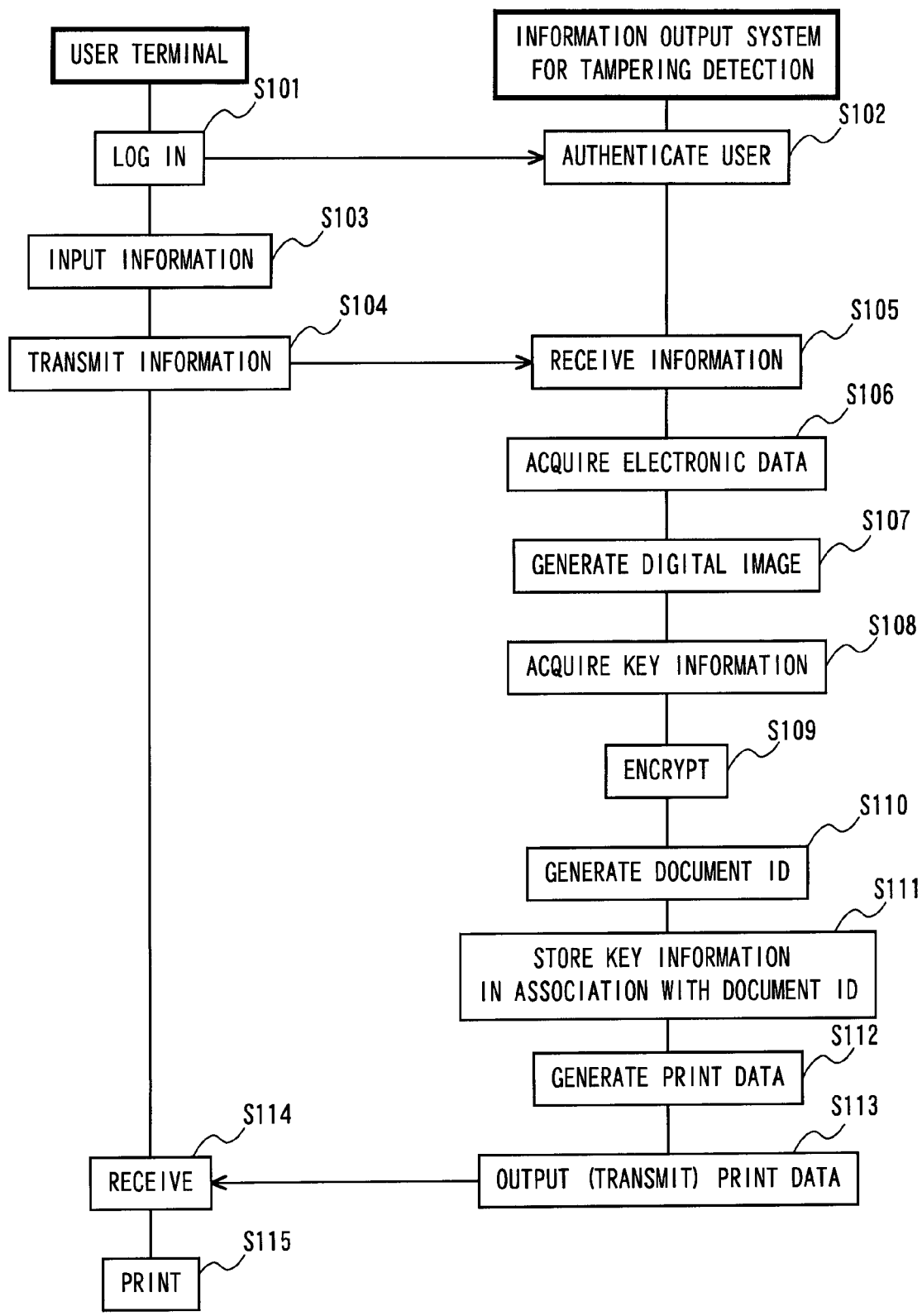
FIG. 3 is a sequence chart illustrating a flow of certificate issuing processing according to this embodiment.

FIG. 3 is a sequence chart illustrating a flow of certificate issuing processing according to this embodiment. The certificate issuing processing is started when the user operates the user terminal 112a to log in to the information output system for tampering detection 100.

In Step S101 and Step S102, login processing is performed. The user terminal 112a receives the input of a login instruction by the user and transmits login information to the information output system for tampering detection 100 (Step S101). This login information includes a password and the like besides information for identifying the user who operates the terminal. The information output system for tampering detection 100 receives the login information transmitted by the terminal. The user authenticating unit 24 compares the received login information and information for authentication stored on a server side to authenticate the user (Step S102). The login processing may involve a plurality of times of communication between the user terminal 112a and the information output system for tampering detection 100. An authentication server for authenticating the user terminal 112a may be prepared separately from the information output system for tampering detection 100 to authenticate the user. Thereafter, the processing proceeds to Step S103.

In Step S103 to Step S105, information necessary for issuance of a certificate which includes designation of a certificate that the user desires to acquire is input, and an issuance request for the certificate and the input information are transmitted from the user terminal 112a to the information output system for tampering detection 100. The user terminal 112a receives the input by the user via the input device such as the mouse and the keyboard to designate a type, content, and the like of the certificate desired by the user (Step S103). The user terminal 112a transmits various kinds of information necessary for issuance of the certificate, which are designated based on the user operation, to the information output system for tampering detection 100 (Step S104). The user input receiving unit 26 of the information output system for tampering detection 100 receives the various kinds of information transmitted from the user terminal 112a and records the information in the RAM 102 (Step S105). Thereafter, the processing proceeds to Step S106.

In Step S106, electronic data for certificate creation is acquired. The electronic data acquiring unit 17 searches the certificate information database 23 with the information received in Step S105 (e.g., when the certificate to be issued is a certificate of residence, a name, an address, and the like described in the certificate of residence requested to be issued) as a search key to retrieve and acquire electronic data necessary for creation of the certificate. Thereafter, the processing proceeds to Step S107.

In Step S107, a digital image is generated. The digital image acquiring unit 15 lays out the electronic data acquired in Step S106 in a format of a certificate for printing on a paper medium, which is set in advance, and creates bitmap data of an image for printing or an image for display to acquire a digital image. Thereafter, the processing proceeds to Step S108.

In Step S108, key information is generated. The key information acquiring unit 22 generates a set of an encryption key and a decryption key (hereinafter, key information) used for encryption of the digital image acquired in Step S107. In generating the key information, it is preferable that that key information that is less easily guessed and has sufficient intensity be created. In this embodiment, the key information is automatically generated every time issuance processing for a certificate is performed. However, the key information may be determined in advance by a certificate issuing agency or an administrator of the information output system for tampering detection 100 and stored in the key information table in advance. It is preferable that this key information be kept secret from the user so that the user cannot tamper content of the certificate and create an encrypted image based on content after tampering. Thereafter, the processing proceeds to Step S109.

In Step S109, encryption is performed and an encrypted image is generated. The encrypting unit 11 encrypts the digital image generated in Step S107 using the encryption key generated in Step S108. In encrypting the digital image, a part of the digital image rather than the entire digital image may be designated and encrypted. For example, a part of the digital image or the entire digital image may be designated by using area designation information, and only this encryption area may be converted based on the encryption key. An area to be encrypted may be set in advance by using the area designation information or may be designated by user operation every time encryption is performed. For example, the user can designate an area as a target of encryption by selecting a range using the mouse while viewing the digital image displayed on the display of the user terminal 112a. Thereafter, the processing proceeds to Step S110.

In Step S110 and Step S111, generation of a document ID and storage of key information are performed. The key information storing unit 21 generates a document ID for identifying the certificate to be issued so that the document ID does not overlap document IDs of certificates issued in the past (Step S110). It is preferable that the document ID generated anew have a value from which the decryption key of the encrypted image included in this certificate cannot be guessed. The key information storing unit 21 accumulates the generated document ID and the key information generated in Step S108 in the key information table constructed on the HDD 103 in association with each other (Step S111). Thereafter, the processing proceeds to Step S112.

In Step S112, print data for the certificate is generated. The output unit 18 generates print data for printing the digital image generated in Step S107 on the front side of a paper medium and for printing the encrypted image generated in Step S109 on the back side of the paper medium. The print data is electronic data including print content for performing printing on the paper medium from the user terminal 112a using the printer 107a. Examples of a data format include the portable document format (PDF). The output unit 18 adds a document ID for identifying the certificate to an area of the back side of the paper medium, which does not overlap the encrypted image. The document ID is added to an image in the encrypted image so as to be displayed together with the encrypted image during printing on the paper medium. Consequently, even when presence or absence of tampering is checked in a submission destination of the certificate, it is possible to read the document ID together with the encrypted image with the scanner 106b or the like and acquire the document ID with means such as an OCR or a barcode reader.

In Step S113 to Step S115, the encrypted image is transmitted to the user terminal 112a and printed. The output unit 18 transmits the print data of the certificate generated in Step S112 to the user terminal 112a (Step S113). The transmitted print data of the certificate is received by the user terminal 112a (Step S114) and printed on the paper medium (Step S115). In this embodiment, the content of the certificate and the image for tampering detection which are included in the print data of the certificate are printed on the front side and the rear of the paper medium. However, the printing on both the front side and the back side may be performed as a series of print processing using a duplex printing function provided in the printer 107a or may be manually performed by the user on each of the sides.

In this embodiment, the information output system for tampering detection 100 operated by the certificate issuing agency or the like performs the processing up to the output of the print data and leaves actual printing to the user. However, the entire series of processing from the generation to the printing of the print data may be performed by the information output system for tampering detection 100.

Figure 4:
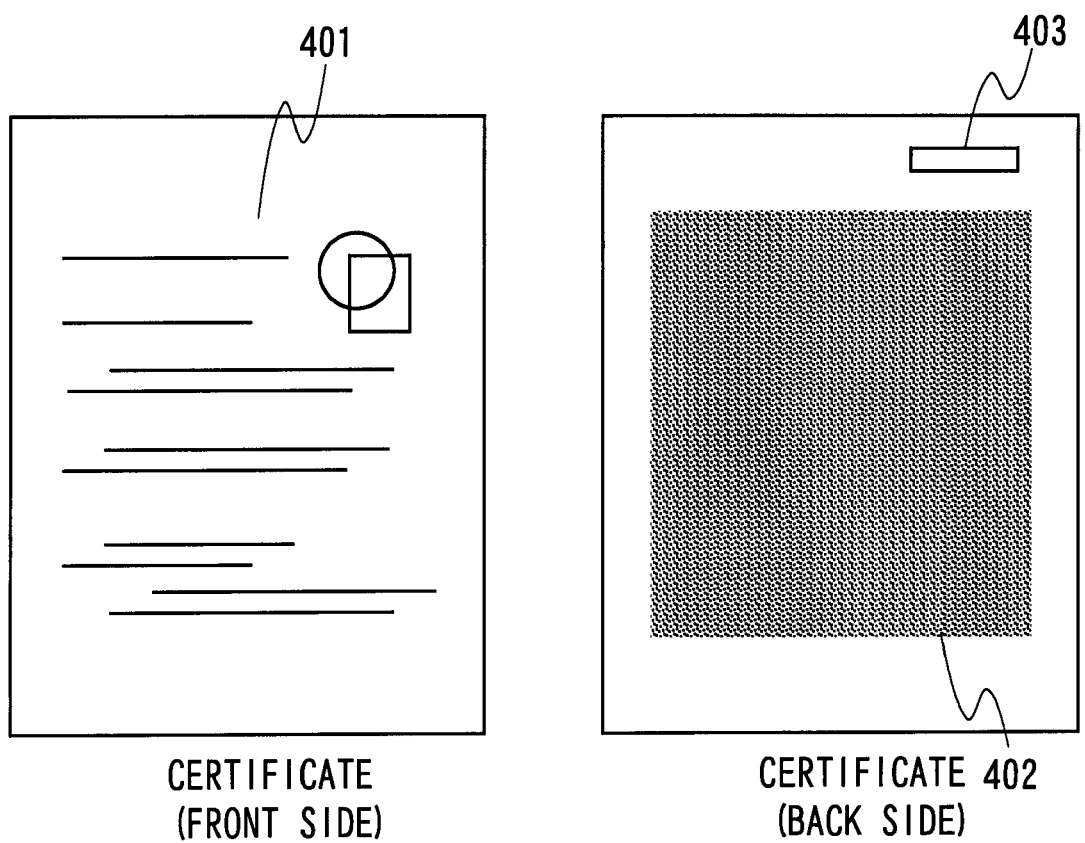
FIG. 4 is a diagram illustrating an overview of a certificate issued by the information output system for tampering detection according to this embodiment and printed from the user terminal by operating the printer.

FIG. 4 is a diagram illustrating an overview of a certificate issued by the information output system for tampering detection 100 according to this embodiment and printed from the user terminal 112a by operating the printer 107a. On the front side of the certificate, an image 401 of the target information that is the content certified by the certificate and also is the target of tampering detection is printed. On the back side of the certificate, an encrypted image 402 generated in the processing described by using the flowchart is printed. In FIG. 4, the entire information to be printed on the front side is set as the target of tampering detection. However, the information as the target of tampering detection may be only a part of the content of the certificate to be printed on the front side. A document ID 403 is printed in a margin of the back side in which the encrypted image is not printed. The document ID 403 may be printed in a format of a barcode, a character string, a sign, or the like.

The user can submit the printed certificate to a third party that requests submission of this certificate. According to the information output system for tampering detection 100 of this embodiment, the user can receive issuance of the certificate, for example, in the home of the user or in a store such as a convenience store without visiting the certificate issuing agency as in the past. In other words, with the tampering prevention information output system according to this embodiment, it is possible to perform issuance of a certificate of residence in a place where a certificate could not be issued in the past because of a characteristic of the certificate, for example, in the convenience store.

Unlike the certificate in the past that is, for example, printed on a special sheet to make copying by the user difficult for preventing illegal acts such as tampering, this certificate is manually printed by the user using a general printer. However, the content of the certificate is encrypted by using the encryption key, which only an issuer of the certificate can know, and printed. Therefore, with the information output system for tampering detection 100 according to this embodiment, it is possible to detect and prevent illegal acts such as un-permitted copying and tampering of the certificate. The certificate issued in this way is submitted to a person who requests submission of the certificate. The person who has received the submission of the certificate can confirm, by causing the information output system for tampering detection 100 to perform processing described below, that the submitted certificate is not tampered.

Figure 5:
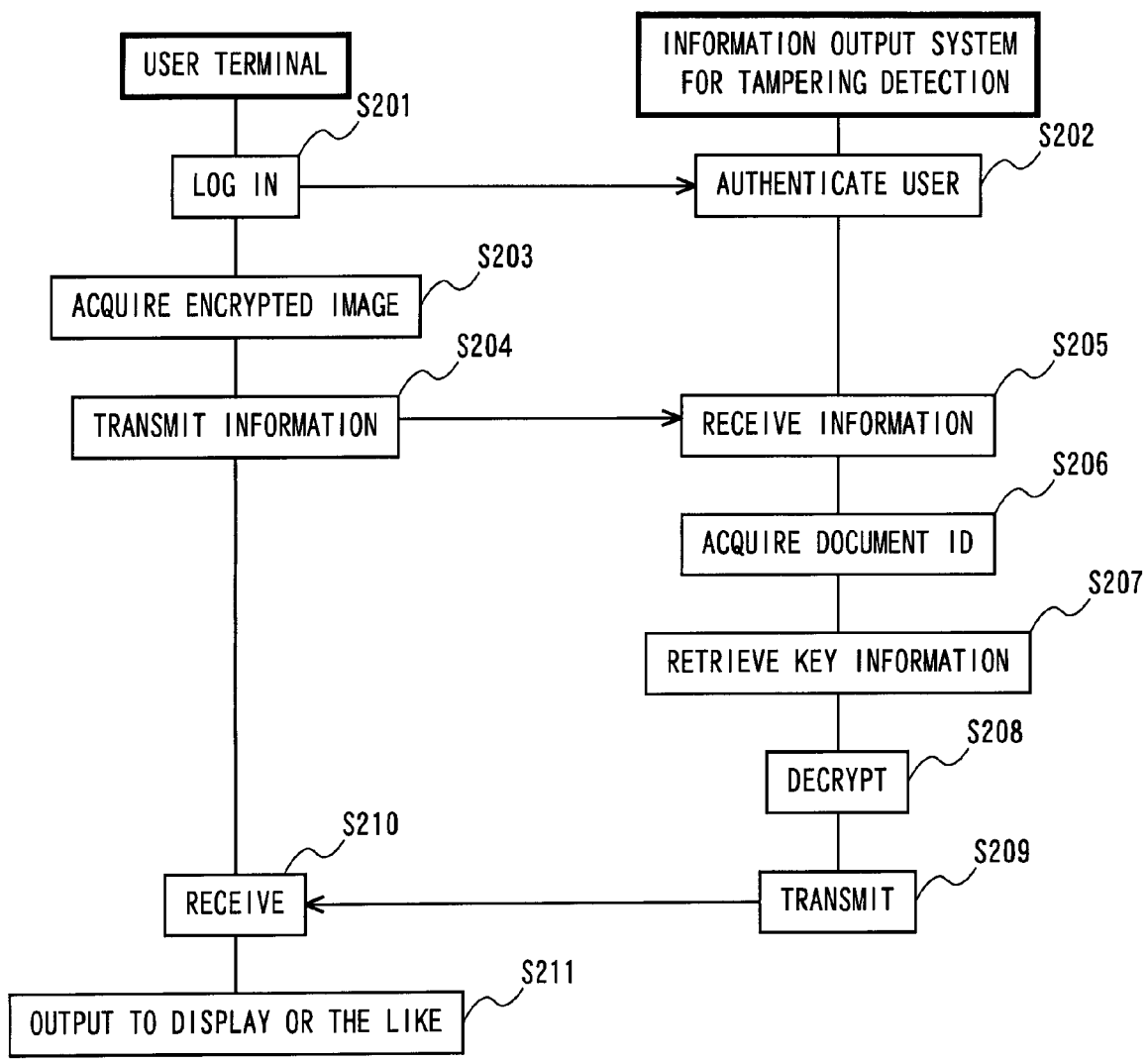
FIG. 5 is a sequence chart illustrating a flow of image output processing for tampering check according to this embodiment.

FIG. 5 is a sequence chart illustrating a flow of image output processing for tampering check according to this embodiment. The image output processing for tampering check is started when a user who has received the submitted certificate (different from the user who operates the user terminal 112a and receives the issuance of the certificate in the processing illustrated in the flowchart of FIG. 3) operates the user terminal 112b and logs in to the information output system for tampering detection 100.

In Step S201 to Step S203, login processing is performed and an encrypted image is acquired. Details of the login processing are the same as those of Step S101 and Step S102 described above, and thus descriptions thereof are omitted. After the login processing is performed, the user sets the submitted certificate to the scanner 106b and operates the scanner 106b via the user terminal 112b to take an image of the back side of the certificate and acquire the encrypted image and the document ID (Step S203). Thereafter, the processing proceeds to Step S204.

In Step S204 and Step S205, various kinds of information necessary for decryption in the information output system for tampering detection 100 are transmitted from the user terminal 112b to the information output system for tampering detection 100. The user terminal 112b transmits the information necessary for decryption of the encrypted image such as the encrypted image and the document ID acquired in Step S203 to the information output system for tampering detection 100 (Step S204). The user input receiving unit 26 of the information output system for tampering detection 100 receives the information transmitted from the user terminal 112b (Step S205) and records the information in the RAM 102. Thereafter, the processing proceeds to Step S206.

In Step S206 and Step S207, the document ID is acquired and a decryption key used for decryption of the encrypted image is acquired. The key information acquiring unit 22 acquires the document ID of the certificate received together with the encrypted image according to a method such as OCR/barcode reading or the like (Step S206). The key information acquiring unit 22 searches the key information accumulated in the key information storing unit 21 using the document ID acquired in Step S206 to acquire key information (in this case, decryption key) related to the certificate set as a target of tampering check this time. Thereafter, the processing proceeds to Step S208.

In Step S208, decryption is performed and a digital image is generated. The decrypting unit 14 decrypts the encrypted image acquired in Step S205 using the decryption key acquired in Step S207. Thereafter, the processing proceeds to Step S209.

In Step S209 to Step S211, the decrypted digital image is transmitted to the user terminal 112b and output to the display or the like. The output unit 18 transmits the digital image decrypted in Step S208 to the user terminal 112b (Step S209). The transmitted digital image is received by the user terminal 112b (Step S210) and output to the display connected to the user terminal 112b. Thereafter, the processing illustrated in this flowchart ends.

According to the information output system for tampering detection 100 of this embodiment, the user can view the digital image obtained by decrypting the encrypted image on the back side of the certificate and compare the digital image with the target information of tampering detection on the front side of the certificate. The user can grasp presence or absence of tampering and, when tampering is made, a tampered part, content of the tampering, and correct information before the tampering by comparing the decrypted digital image and the information on the front side of the certificate. In this embodiment, the information output system for tampering detection 100 operated by the certificate issuing agency or the like performs the decryption of the encrypted image. However, instead of such a configuration, a system operated by the certificate issuing agency or the like may perform the processing up to the acquisition of the decryption key, and a user terminal (in this case, the user terminal corresponds to the information output system for tampering detection according to the present invention) may perform actual decryption processing.

According to the information output system for tampering detection 100 of this embodiment, the generation of the encrypted image as data for tampering detection is performed based on the digital image of the content of the certificate. Therefore, unlike the conventional technology of preventing tampering, it is possible to perform detection of tampering not only for text characters but also for any information printed on a paper medium ranging from photographs, illustrations, or texts to a document in which photographs and illustrations are mixed. In particular, concerning a certificate in which external characters and special characters in a text are represented by embedding of images (e.g., a certificate of residence corresponds to the certificate), it is possible to generate an encrypted image for tampering detection without performing complicated processing.

In this embodiment, as a method of acquiring the decryption key in decrypting the encrypted image, the method of searching the key information table using the document ID is adopted. However, other methods may be adopted for acquisition of key information during decryption. For example, there is a method of acquiring the decryption key by printing information obtained as a result of encrypting the key information with another key on the certificate and decrypting this encrypted key information with the system 100 during decryption. Consequently, it is possible to print the key information on the certificate without informing the user of the key information. The encrypted key information may be printed on the certificate in a format of a QR code or the like.

In the description of this embodiment, a certificate formed by one paper medium is issued and tampering of this certificate is detected. However, a document set as a tampering detection target by the information output system for tampering detection according to the present invention is not limited to a document including one paper medium. For example, when tampering of a document covering a plurality of pages is prevented, one encrypted image for tampering detection may be generated for each of the pages. However, for example, tampering can be detected for all the pages of the document covering a plurality of pages using a single encrypted image by generating a single digital image in which the plurality of pages are reduced in size and arranged in a thumbnail shape and by encrypting this digital image. Even when an encrypted image is generated for each of the pages, an area necessary for printing of the encrypted image can be saved by reducing in size and encrypting an image of target information for tampering detection.

<Encrypting Unit and Decrypting Unit>

Next, outlines of the encrypting process by the encrypting unit and of the decrypting process by the decrypting unit in the first through third embodiments, will be explained.

Figure 6:
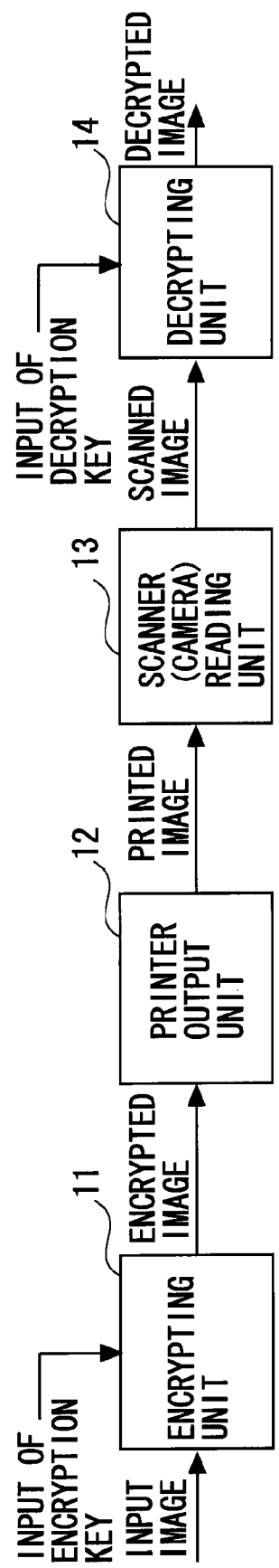
FIG. 6 is a diagram showing a processing outline (part 1) of the encrypting process and the decrypting process.

FIG. 6 is a diagram showing a processing outline (part 1) of the encrypting process and the decrypting process. In FIG. 6, the encrypting unit 11 (which is referred to as an encrypting unit 11A, encrypting unit 11B and an encrypting unit 11C in first through third modes, respectively) outputs the encrypted image into which part of the digital image has been encrypted on the basis of the inputted digital image and the encryption key specifying the encrypting method. The printer output unit 12 prints the digital image encrypted by the encrypting unit 11 on a printable physical medium such as the paper. The scanner (camera) reading unit 13 reads the printed image output by the printer output unit 12 by employing the scanner or the camera.

Then, the decrypting unit 14 (which is termed a decrypting unit 14A, a decrypting unit 14B and a decrypting unit 14C in the first through third modes, respectively) obtains the printed image output by the printer output unit 12 and the decrypted image with the inputted decryption key. As far as the inputted decryption key is valid, the encrypted image can be properly decrypted, and the information hidden with the encryption by the encrypting unit 11 gets visible.

Figure 7:
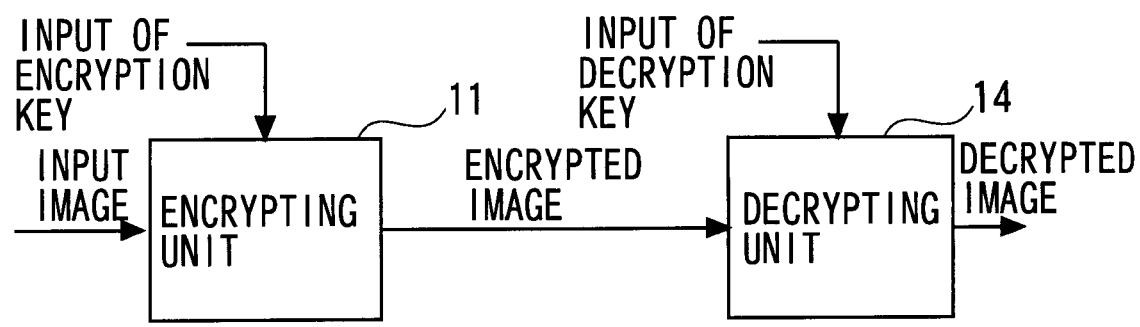
FIG. 7 is a diagram showing a processing outline (part 2) of the encrypting process and the decrypting process.

FIG. 7 is a diagram showing a processing outline (part 2) of the encrypting process and the decrypting process. As shown in FIG. 7, the encrypting process and the decrypting process in the first through third modes to which the present invention is applied, enable the decrypted image to be acquired by inputting the digital image encrypted by the encrypting unit 11 in an as-is state of the electronic document image without via the printer and the scanner to the decrypting unit 14.

Next, the first through the third modes to which the present invention is applied will be described, respectively. To begin with, the first mode to which the present invention is applied will be described.

Figure 8:
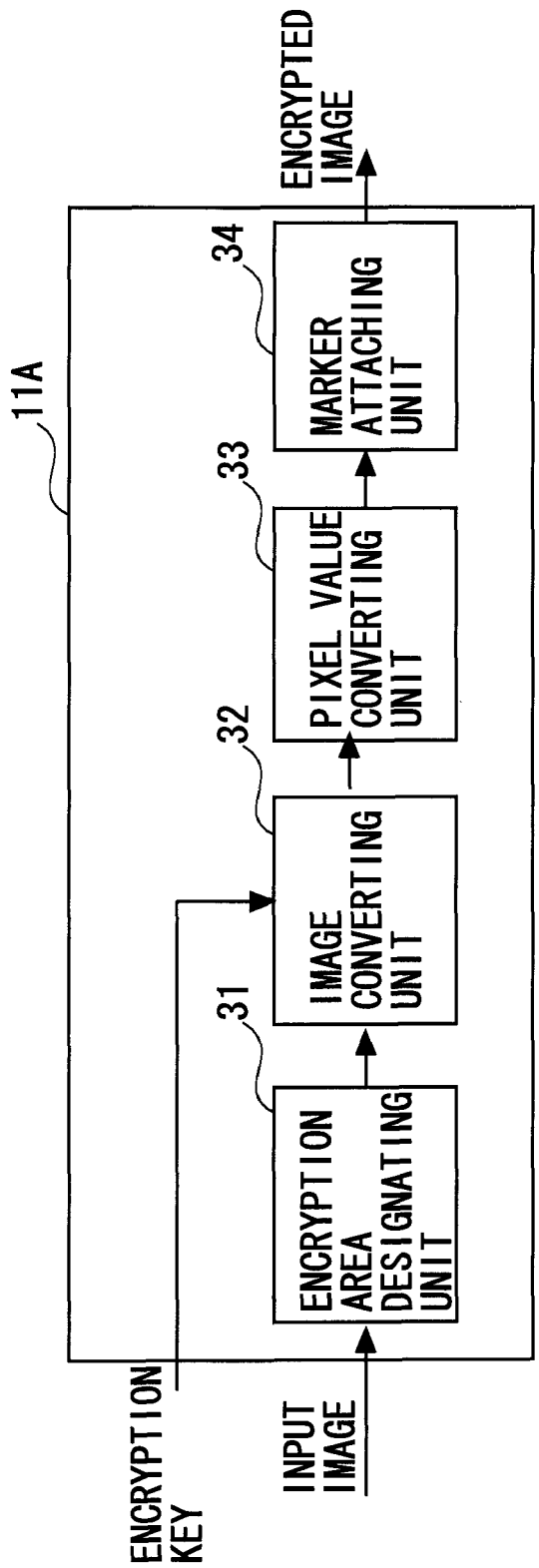
FIG. 8 is a diagram showing an outline of the encrypting process in a first mode.

FIG. 8 is a diagram illustrating an outline of the encrypting process in the first mode. In FIG. 8, the encrypting unit 11A includes an encryption area determining (designating) unit 31, an image converting unit 32, a pixel value converting unit 33 and a marker adding unit 34.

The encryption area designating (determining) unit 31 selects an area to be encrypted from the inputted image containing the want-to-encrypt area.

Figure 9:
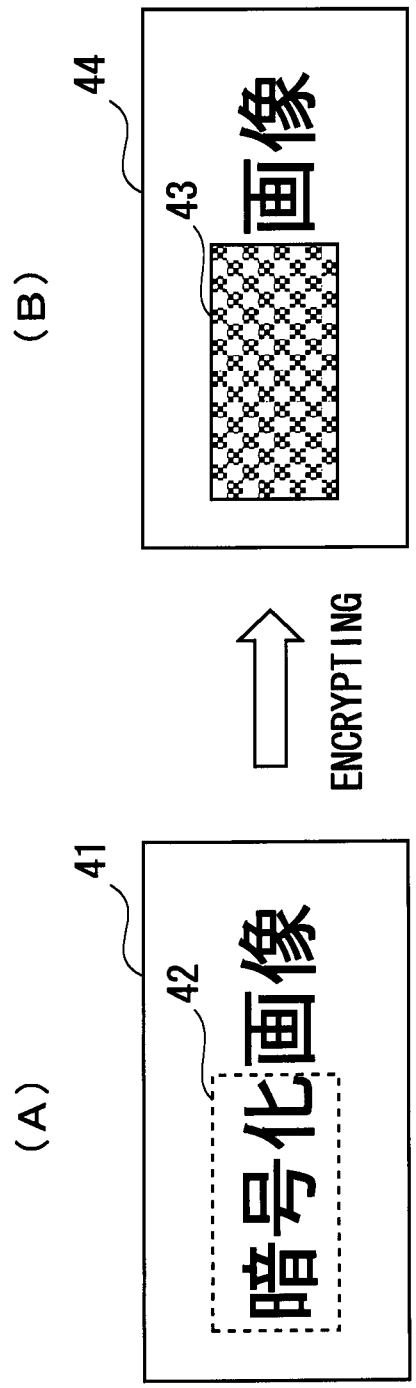
FIG. 9 is a diagram showing an example of selecting an encryption area.

FIG. 9 is a diagram showing an example of selecting the encryption area. To be specific, the encryption area designating unit 31 selects, as illustrated in (A) of FIG. 9(A), an area 42 to be encrypted out of a digital image (inputted image) 41 containing the want-to-encrypt area. The area 42 is converted into a converted image 43 as illustrated in (B) of FIG. 9 by the processes of the image converting unit 32 and the pixel value converting unit 33 that will hereinafter be described, and the digital image 41 is converted into an encrypted image 44 containing the converted image 43.

The discussion gets back to the description in FIG. 8. When the encryption area designating unit 31 selects the area 42 to be encrypted, the image converting unit 32 inputs the to-be-encryption area 42 and the encryption key, and visually converts the an image of the to-be-encryption area 42 by a converting method associated with the encryption key. A conversion parameter on this occasion is generated based on binary data obtained from the inputted encryption key.

Figure 10:
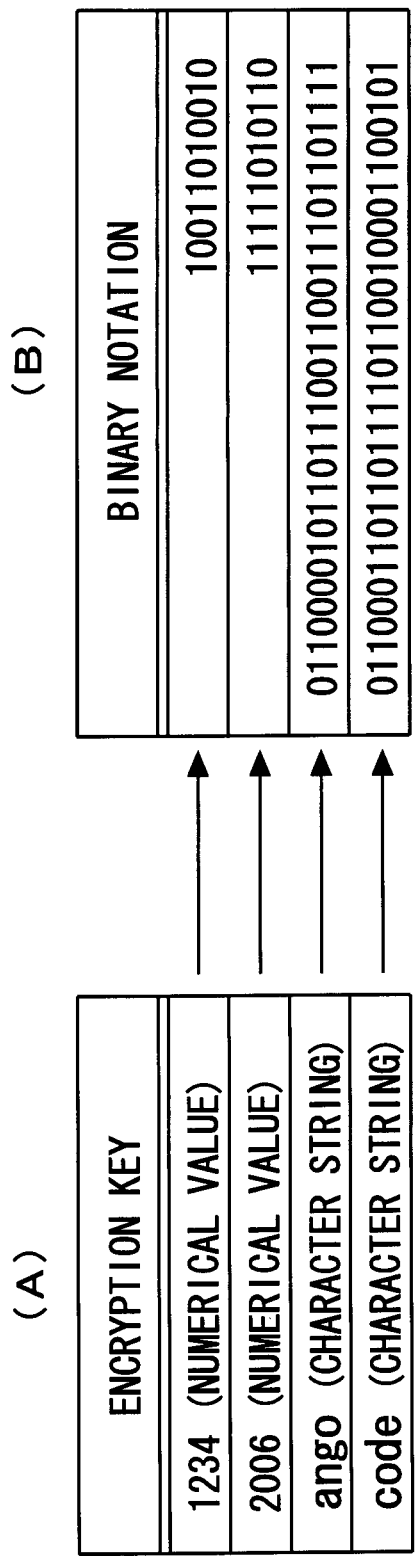
FIG. 10 is a diagram showing an input example of the encryption key.

FIG. 10 is a diagram showing an example of inputting the encryption key. FIG. 10 shows an example of the encryption key and an example of the binary data generated from the encryption key. For example, a numeric value [1234] used as the encryption key is inputted in the form of binary data [100011010010], and a character string [ango] as the encryption key is inputted in the form of binary data [01100001011011100110011101101111].

The first mode exemplifies, as the image converting methods, two converting methods, i.e., one method based on a process (called a scramble process) of segmenting the image into micro areas and rearranging the micro areas and another method based on an image compression process.

To start with, the scramble process will be described. The scramble process is that at first the image of the selected area 42 is segmented into the micro areas each having a fixed size, and next the micro areas are rearranged based on the binary data obtained from the encryption key.

Figure 11:
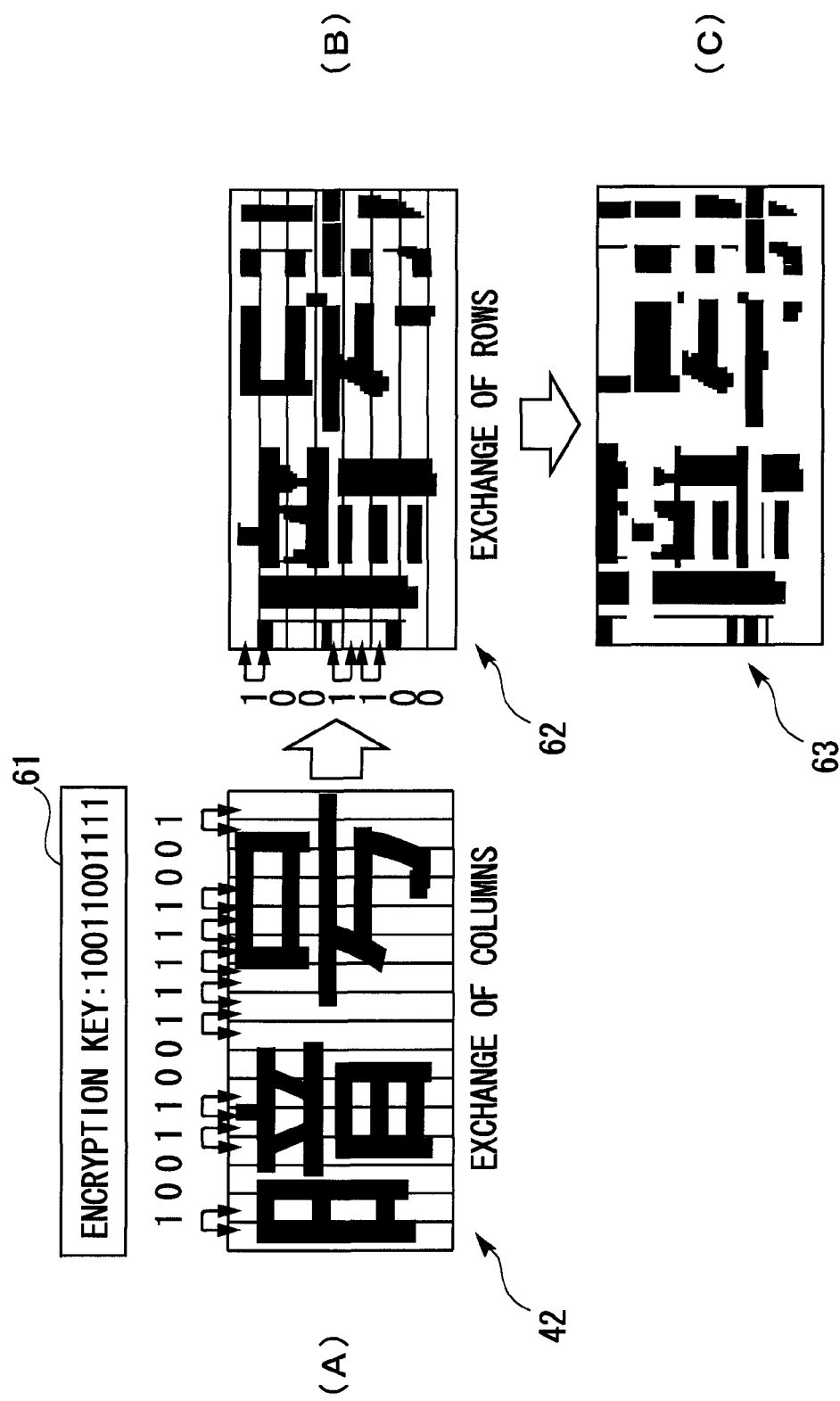
FIG. 11 is a diagram showing one example of a scramble process in an image converting unit.

FIG. 11 is a diagram showing one example of the scramble process by the image converting unit. As shown in (A) of FIG. 11, at the first onset, the area 42 selected by the encryption area designating unit 31 is segmented in a vertical direction, respective bits of a binary string of the encryption key 61 are set corresponding to borders between the segmented areas (micro areas) 42 in sequence from the left, when the bit is [1], neighboring segmented columns (segmented areas) are exchanged with each other, and, when the bit is [0], an execute-nothing-process is conducted in sequence from the left side. If the bit count of the binary string is insufficient for a segmentation border count, the same binary string is repeated from a position where the insufficiency occurs, thus performing the exchanging process up to the right end of the area 42.

Subsequently, as shown in (B) of FIG. 11, an image area 62 undergoing the exchange process is segmented in a horizontal direction, the respective bits of the binary string of the encryption key 61 is set corresponding to the boarders between the segmented image areas 62 in sequence from above, and the same exchanging process as done for the vertical segmentation is executed sequentially from above on a row-by-row basis.

Then, as illustrated in (C) of FIG. 11, as a result of executing the exchanging process on the individual segmented images, a scramble image 63, defined as a processed image into which the original area 42 has been subjected to the scramble process, is acquired.

An extension method of this exemplified scramble process can involve executing the scramble process twice or more both in the horizontal direction and in the vertical direction, and can further involve changing the size of the segmented area in the exchange conducted from the second time onward. Moreover, different binary strings can be also employed for exchanging the segmented areas in the horizontal direction and in the vertical direction. These extension methods are, if a size of the inputted image is small while a bit length of the encryption key is large, effective especially as a means for preventing absolutely the same processed image from being generated based on the different encryption key.

Figure 12:
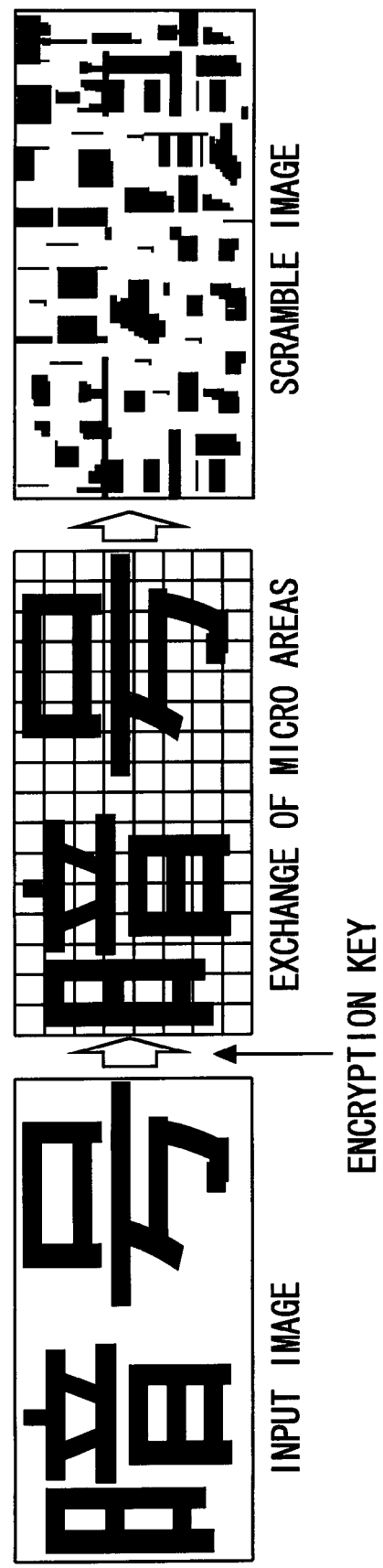
FIG. 12 is a diagram showing another example of the scramble process in the image converting unit.

FIG. 12 is a diagram illustrating another example of the scramble process in the image converting unit. A method of exchanging the pixels on the unit of the micro area as illustrated in FIG. 12 can be used as another scramble processing method different from the scramble process explained with reference to FIG. 11. More specifically, the inputted image is segmented into the micro areas each taking a rectangular shape, and the segmented micro areas are exchanged with each other. This scheme has a greater scrambling count and enables strength of the encryption to a greater degree than by the method of conducting the exchanges in the horizontal direction (row) and in the vertical direction (column) described above.

Figure 13:
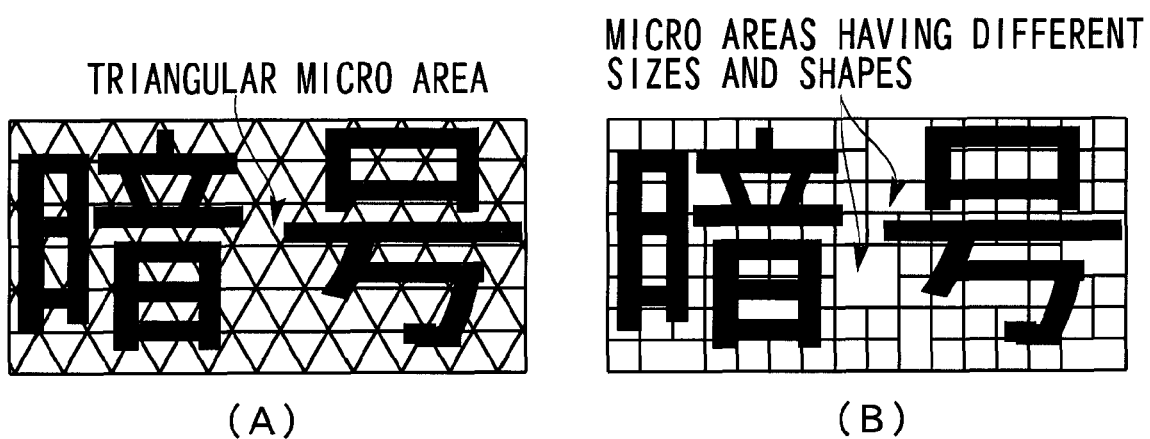
FIG. 13 is a diagram showing a modified example of a shape of a micro area in the scramble process.

FIG. 13 is a diagram showing modified examples of the shape of the micro area in the scramble process. Further, the shape of the micro area when executing the scramble process can include, e.g., a triangle as illustrated in (A) of FIG. 13 in addition to the rectangle illustrated in FIG. 12. Moreover, as illustrated in (A) of FIG. 13, the micro areas having different shapes and different sizes can coexist as shown in (B) of FIG. 13.

Next, the converting method based on the image compressing process will be described.

Figure 14:
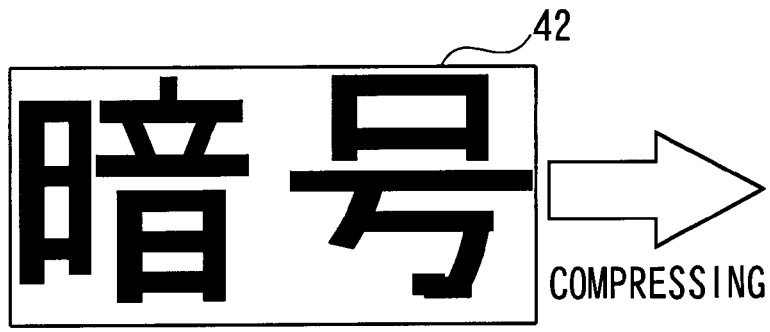
FIG. 14 is a diagram showing a compressing process in the image converting unit.

FIG. 14 is a diagram showing a compression process in the image converting unit. When the input image 41 is a binary image, at first, as illustrated in (A) of FIG. 14, a binary string 71 as shown in (B) of FIG. 14 is generated by compressing an image of the area 42 selected by the encryption area designating unit 31. A compression method herein can involve applying all types of compression methods such as a run-length compression method used for transferring binary image data in a facsimile apparatus and a JBIG (Joint Bi-level Image experts Group) compression method defined as a standard compression method for the binary image.

Figure 15:
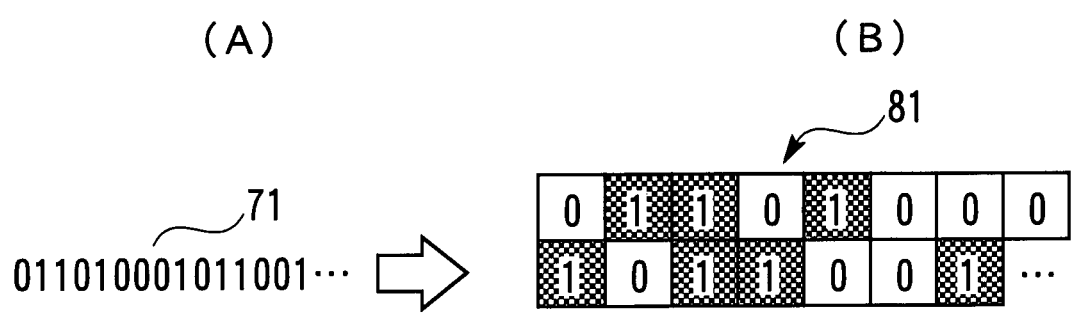
FIG. 15 is a diagram showing a process of transforming converted image into an image.

FIG. 15 is a diagram showing a process of transforming the converted data into the images. As shown in FIG. 14, subsequent to the compression of the area 42, the respective bits of the binary string 71 defined as the converted compression data are arrayed as black-and-white square images 81 in the area 42 of the image to be encrypted in a way that generates the square images (processed images) 81 by enlarging [0] bits as [white] squares and [1] bits as [black] squares in a designated size as illustrated in (B) of FIG. 15.

If desired to array the converted compression data (binary string 71) within the image of the selected area 42, the size of the square image 81 depends on a compression rate of the selected area 42. For example, if the compression rate is equal to or smaller than ¼, the size of the square image 81 is equivalent to (2×2) pixels at most, and, if equal to or smaller than ¹⁄₁₆, the size is equivalent to (4×4) pixels at most.

On the other hand, if desired to designate the size of the square image 81 and to arrange the compressed data within the image of the area 42, it is necessary for attaining a compression rate depending on the size of the square image 81 in the first image compression process. In the case of setting the square to, e.g., a (4×4) pixel size, the compression rate equal to or larger than ¹⁄₁₆ is needed. In this case, effective methods are a method of previously compressing the information in the selected area 42 and an irreversible compression method.

The encryption process of transforming the compressed data into the image in enlargement enables the enlarged black-and-white blocks to be recognized even when reading the encrypted image with, e.g., a low-resolution camera, and hence the encrypted image can be correctly decrypted.

The discussion gets back to the illustration in FIG. 8. A pixel value converting unit 33 converts at the fixed intervals the pixels within the processed image 63 converted by the image converting unit 32, thus making the converted image 43 take substantially a grating-shaped stripped pattern.

Figure 16:
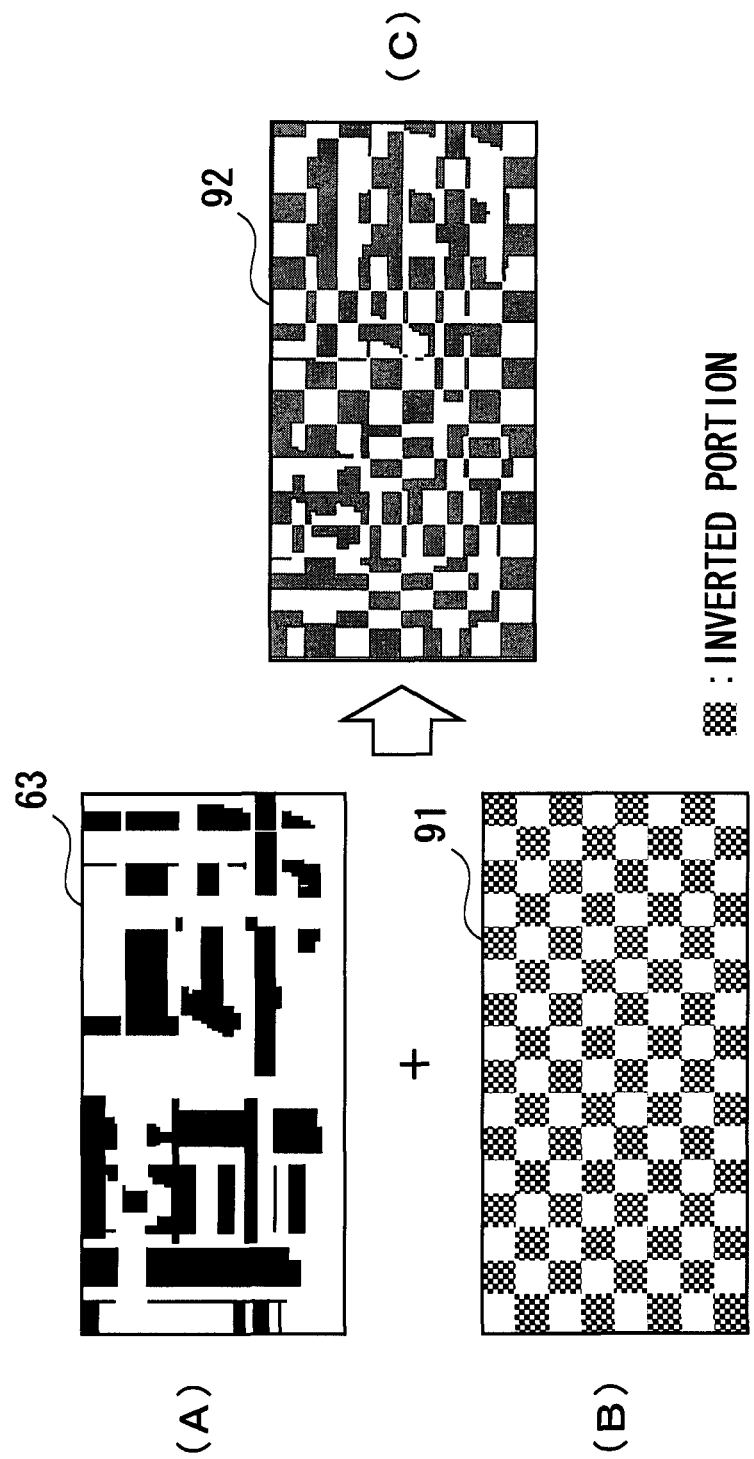
FIG. 16 is a diagram showing an example (part 1) of a pixel value converting process in a pixel value converting unit.

FIG. 16 is a diagram showing an example (part 1) of a pixel value converting process. The pixel value converting unit 33 converts at the fixed intervals the pixels of the processed image 63 into which the area is scrambled by the image converting unit 32, whereby the encrypted image 44 takes substantially the grating-shaped stripped pattern as a whole. For example, as illustrated in FIG. 16, a converted image 92 in which the encrypted image 44 takes substantially the grating-shaped stripped pattern on the whole is acquired as shown in (C) by executing such conversion that the scramble image 63 shown in (A) of FIG. 16 is inverted (inversion process) with colored portions of a checkered pattern image 91 illustrated in FIG. (B). The stripped pattern to be generated is thereby used for detecting minute positions of the respective pixels within the encryption area when decrypting the encrypted image 44.

Another conversion can be carried out for a series of these processes. For example, the process of inverting the pixel values may also be a process of adding a designated value.

Further, a checkered pattern image 91 illustrated in (B) of FIG. 16 has substantially the same size as the scramble image 63 shown in (A) has, however, only the central area, excluding the peripheral area, of the scramble image 63 may also be subjected to the inverting process.

Figure 17:
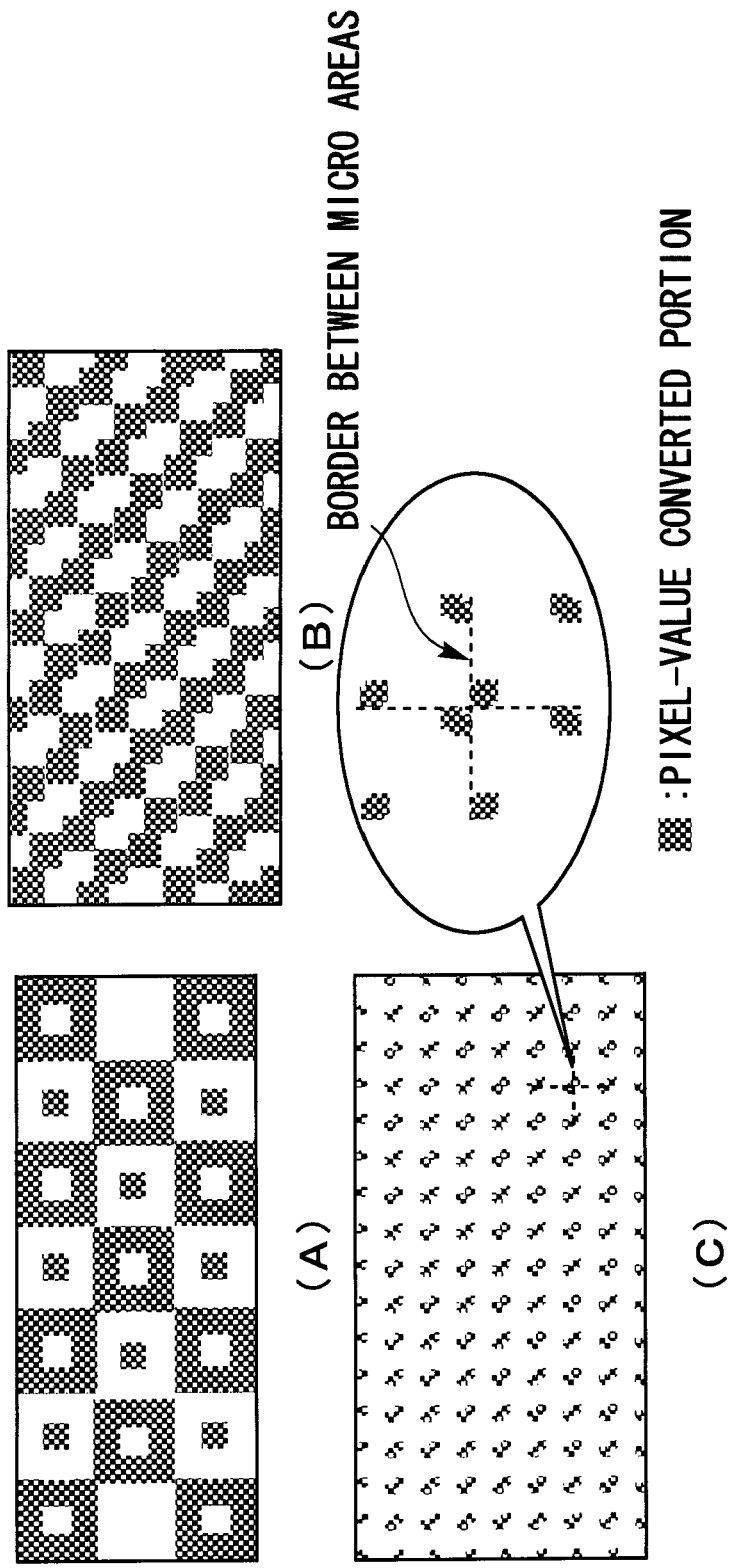
FIG. 17 is a diagram showing an example (part 2) of the pixel value converting process in the pixel value converting unit.

FIG. 17 is a diagram showing an example (part 2) of the pixel value converting process by the pixel value converting unit. Moreover, a variety of shapes as illustrated in (A) through (C) of FIG. 17 can be applied to the area 42 in which to convert the pixel values. The conversion of the pixel values is a process aiming at detecting the border position between the micro areas with the high accuracy, and hence it is considered that, e.g., as in (A) of FIG. 17, only the border portions are pixel-value-converted. Further, as in (B) of FIG. 17, the borders between the conversion and the non-conversion appear at much minuter intervals by converting the pixel values while shifting little by little with respect to the micro areas, whereby the positions of the pixels of the encrypted image 44 can be detected in much greater detail in the decrypting process. Moreover, as in (C) of FIG. 17, only portions, in which the borders between the micro areas, are pixel-value-converted, thereby enabling deterioration of an image quality to be restrained to the minimum when reading and decrypting the images printed on a sheet of paper etc with the scanner and the camera.

Herein, such a postscript is added that if the shape of the micro area is not the square having a uniform size and if the micro areas are triangular ((A) of FIG. 13) of if the micro areas having different sizes and different shapes coexist (B) of FIG. 13), the pixel values are required to be converted by methods corresponding to the shapes without being limited to the conversion examples given above.

As described above, the present invention takes not the scheme that the regular patterns representing the encrypted positions are generated in the way of being overwritten on the inputted image as in Patent document 1 but the scheme that the regular patterns are generated by converting the pixel values of the inputted image. Accordingly, it does not happen that the image information of the edge portions of the encrypted image are sacrificed as by the prior arts, and the encryption can be done at the high efficiency in the form of making the position detecting information coexist with the original image information.

Note that if the pattern forming portions contain some pieces of image information, the regularity thereof is lost more or less, however, as will be mentioned about he process of the decrypting unit 14 that will be described later on, the encrypted positions can be detected by making use of statistical characteristics of the whole encrypted image.

The discussion gets back to the illustration in FIG. 8. The marker adding unit 34 adds positioning markers to, e.g., three corners other than the right lower corner among the four corners of the converted image 92 undergoing the converting process by the pixel value converting unit 33, thereby generating the encrypted image 44.

The marker adding unit 34 allocates the positioning markers for specifying the position of the encryption area 42 to the three corners excluding the right lower corner among the four corners of the converted image 92.

FIG. 18 is a diagram illustrating examples of the positioning markers used for the encryption process. The positioning marker used in the first mode takes, it may be assumed, a circled cross as illustrated in (A) of FIG. 18. The shape of the positioning marker may be in a broader sense formed by the circle or a polygon of a solid line and a plurality of lines intersecting the periphery thereof. This is exemplified such as a shape of [intra-square cross] which resembles kanji character [田] used as the positioning marker in (B) of FIG. 18, a circled Y consisting of three lines extending radially toward the periphery from the center as in the case of the positioning marker in (C), and a circled centrally-voided cross (lines disconnected at the center) as in the case of the positioning marker in (D).

Moreover, a color combination of the positioning marker may be such that most simply the background is white, while the foreground is black, however, it does not cause any inconvenience to properly change the color combination corresponding to a color (pixel values) distribution of the converted image 92 without being limited to the color combination given above. Further, a thinkable method is not that the determined colors are designated for the background and the foreground but that the positioning marker is formed by inverting the pixels values of the foreground while the background color is set to an as-is color of the digital image 41. With this contrivance, the image is encrypted while retaining the input image information of the positioning marker.

Figure 19:
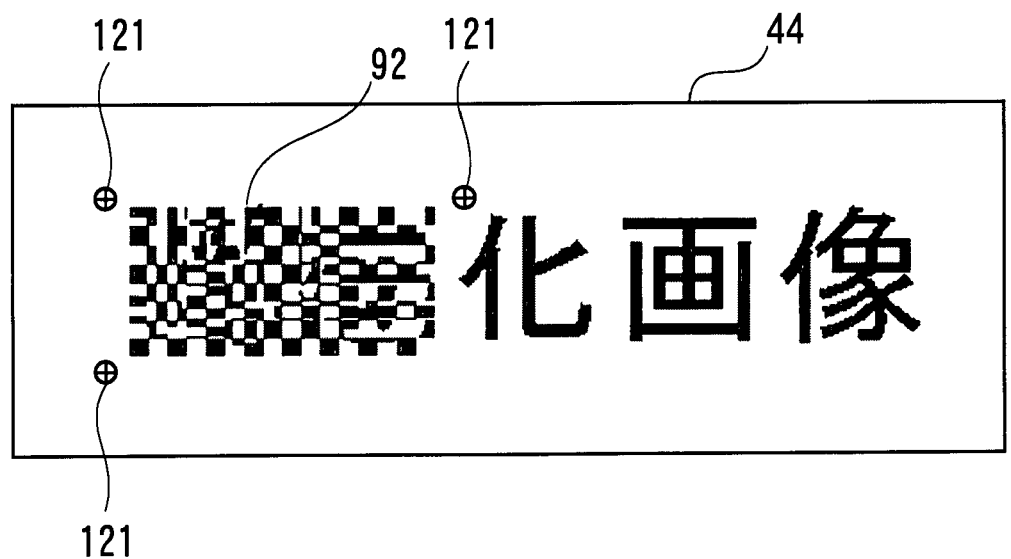
FIG. 19 is a diagram showing an example of the encrypted image.

FIG. 19 is a diagram illustrating an example of the encrypted image. By the processes of the encrypting unit 11A, finally the encrypted image 44 as illustrated in FIG. 19 is generated. The encrypted image 44 contains the converted image 92 and a positioning marker 121.

Moreover, in the encrypting method according to the first mode, when the image converting unit 32 adopts the [micro area rearranging process (scramble process)], the encryption process can be applied to a gray-scale image and a color image as well as to the binary image.

Figure 20:
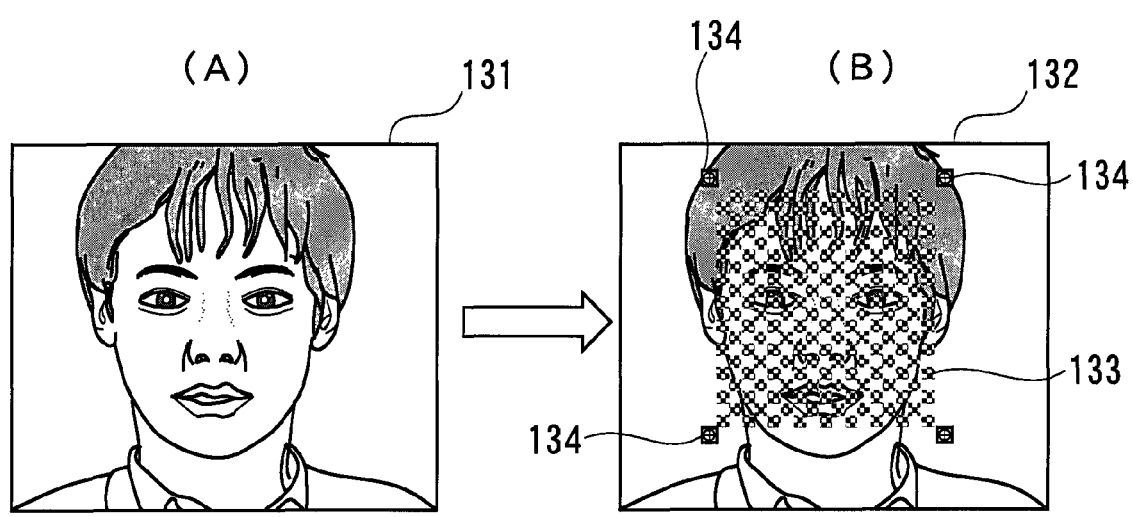
FIG. 20 is a diagram of an example of encrypting a gray-scale image.

FIG. 20 shows an example of how the gray-scale image is encrypted. In FIG. 20, a gray-scale image 131 illustrated in (A) is subjected to the process by the encrypting unit 11A, thereby generating an encrypted image 132 containing a converted image 133 and a positioning marker 134 as illustrated in (B).

Next, the decrypting unit 14A will be described.

Figure 21:
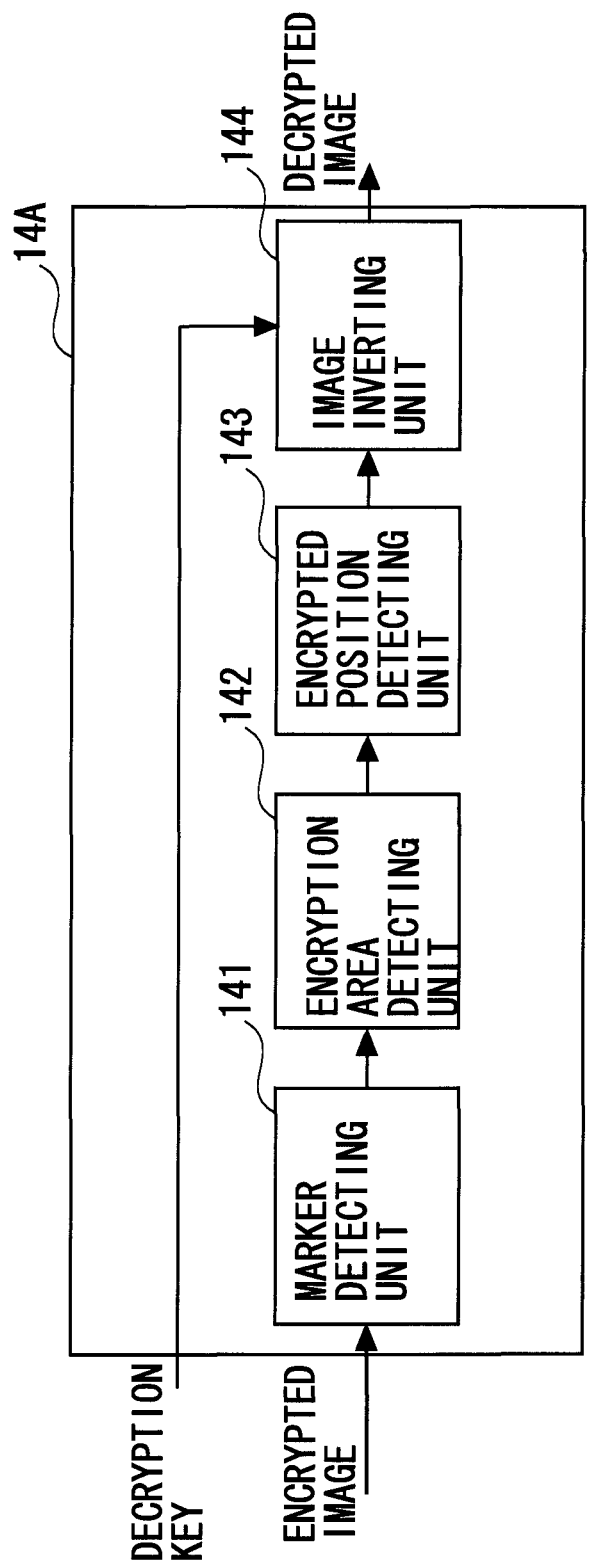
FIG. 21 is a diagram showing an outline of a decrypting process in the first mode.

FIG. 21 is a diagram showing an outline of the decrypting process in the first mode. In FIG. 21, the decrypting unit 14A includes a marker detecting unit 141, an encryption area detecting unit 142, an encrypted position detecting unit 143 and an image inverting unit 144.

The marker detecting unit 141 detects, from the encrypted image, a position of the positioning marker added by the marker adding unit 34 in a way that uses a general image recognition technology. An applicable method as the detecting method involves using pattern matching and analyzing connectivity of graphics.

The encryption area detecting unit 142 detects the encrypted image area on the basis of the positional relation between the three positioning markers detected by the marker detecting unit 141.

Figure 22:
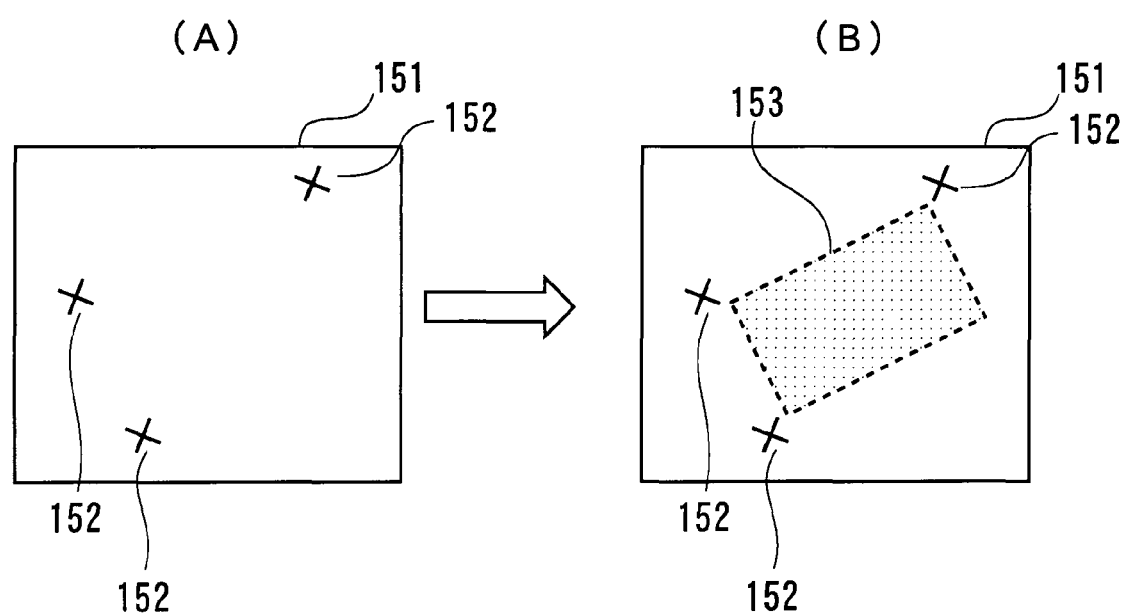
FIG. 22 is a diagram showing a process of detecting the encryption area from the positioning marker.

FIG. 22 is a diagram showing a process of detecting the encryption area from the positioning marker. As shown in (A) of FIG. 22, when the marker detecting unit 141 detects at least three positioning markers 152 from the encrypted image 151, as illustrated in (B), one encryption area 153 can be detected. Namely, the three positioning markers 152 are disposed at the four corners of the rectangular encryption area 153, and hence a graphic form obtained by connecting these three points (the positions of the positioning markers 152) with lines becomes roughly a right-angled triangle. Then, if the three or more positioning markers 152 are detected, the positional relation between the three positioning markers 152 embraces an area taking a shape that is approximate to the right-angled triangle, and the encryption area 153 takes a rectangular shape in which the three positioning markers 152 correspond to three angular points among the four angular points. Note that if the number of the detected positioning markers 152 is equal to or smaller than "2", the corresponding encryption area 153 can not be specified, and hence the decrypting process is terminated on the assumption that the encrypted image does not exist.

Figure 23:
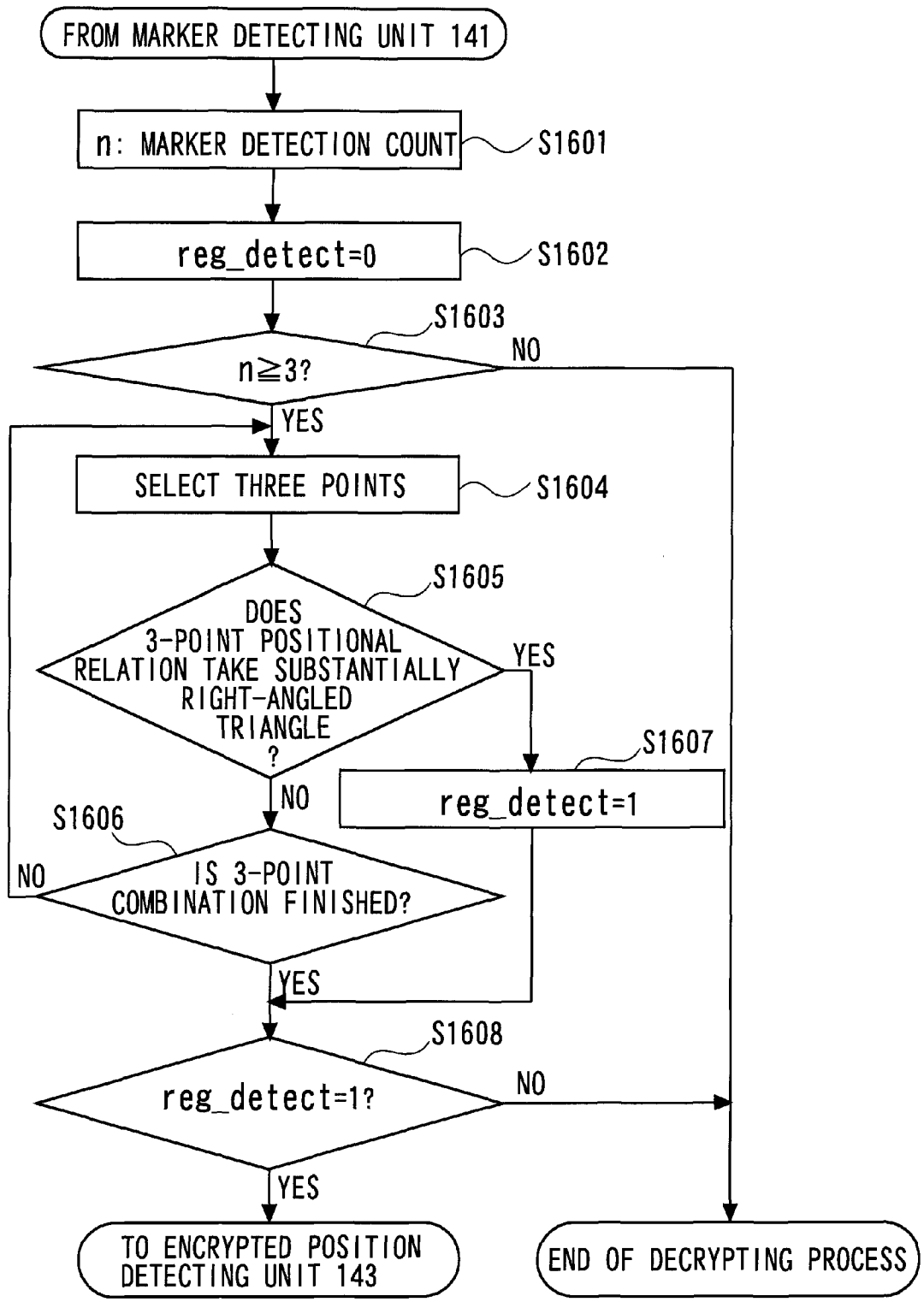
FIG. 23 is a flowchart showing a flow of an encryption area detecting process.

FIG. 23 is a flowchart showing a flow of the encryption area detecting process. The encryption area detecting process executed by the encryption area detecting unit 142 starts with step S1601 in which the number of the positioning markers 152 detected by the marker detecting unit 141 is substituted into a variable n, and in step S1602, "0" is substituted into a detection flag "reg_detect" of the encryption area 153.

Then, in step S1603, it is determined whether or not the variable n, into which the number of the positioning markers 152 is substituted, is equal to or larger than "3", and, if the variable n is not equal to or larger than "3", i.e., if the variable n is not equal to or smaller than "2" (step S1603: No), the decrypting process including the present encryption area detecting process is terminated.

While on the other hand, if the variable n is equal to or larger than "3" (step S1603: Yes), in step S1604, the three positioning markers 152 among the positioning markers 152 detected by the marker detecting unit 141 are selected, and, in step S1605, it is determined whether or not the positional relation between the thus-selected three positioning markers 152 takes substantially the right-angled triangle.

If the positional relation between the selected three positioning markers 152 does not take substantially the right-angled triangle (step S1605: No), in step S1606, it is determined whether or not a 3-point combination of the positioning markers 152 detected by the marker detecting unit 141 is completely finished, then, if not finished (step S1606: No), returning to step S1604, another set of three points is selected, and, when finished (step S1606: Yes), the operation proceeds to step S1608.

Whereas if the positional relation between the selected three positioning markers 152 takes substantially the right-angled triangle (step S1605: Yes), in step S1607, "1" is substituted into the detection flag "reg_detect".

Then, in step S1608, it is determined whether or not "1" is substituted into the detection flag "reg_detect", i.e., it is determined whether or not the three positioning markers 152 of which the 3-point positional relation takes the right-angled triangle can be detected, and the operation proceeds to a process by the encrypted position detecting unit 143 if "1" is substituted into the flag "reg_detect" (step S1608: Yes) and to the decrypting process including the present encryption area detecting process is finished whereas if "1" is not substituted into the flag "reg_detect" (step S1608: No).

The discussion gets back to the illustration in FIG. 21. The encrypted position detecting unit 143 detects minute positions of the respective pixels within the encryption area 153 by the frequency analysis and pattern matching in a way that makes use of a point that the edge portions of the encryption area 153 detected by the encryption area detecting unit 142 have a regular pixel distribution in order to accurately decrypt the encrypted image 151. This detection involves utilizing such a characteristic that the whole of the encrypted image 151 has the periodic pattern owing to the pixel value converting (inverting) process of the pixel value converting unit 33.

One thinkable detection method is a method of obtaining a pattern cycle (width) in horizontal and vertical directions of the image by use of a frequency analyzing method such as Fast Fourier Transform (FFT) and thereafter detecting the border positions (offset) by template matching etc.

Further, the border positions can be detected by Hough transform in a way that utilizes such a characteristic that the border portion becomes rectilinear when applying an edge detection filter (Laplacian filter etc) to the encrypted image.

Figure 24:
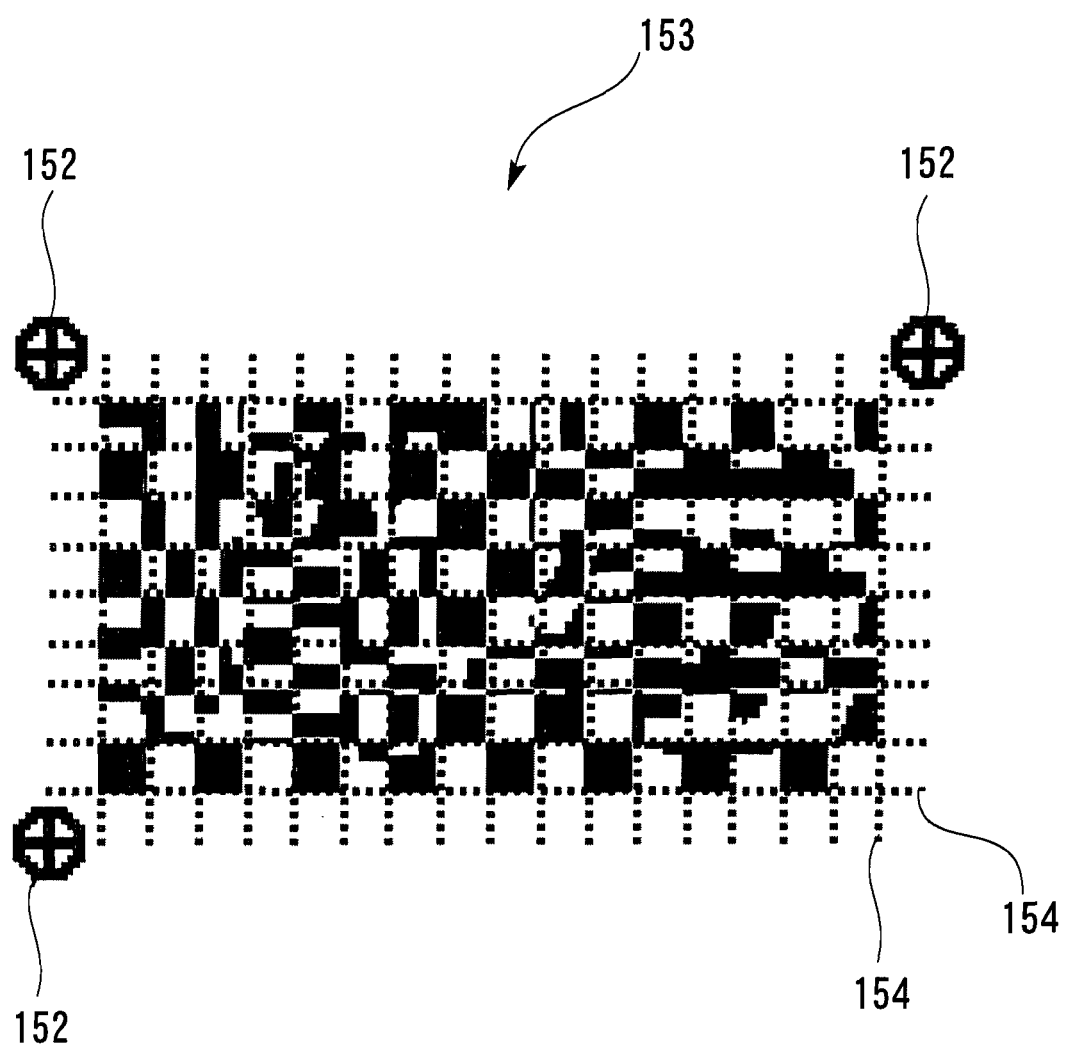
FIG. 24 is a diagram showing an example in which an encrypted position is detected.

FIG. 24 is a diagram showing an example of how the encrypted positions are detected. If the encrypted digital image 41 is complicated, a possibility is that a portion with a remarkably declined cyclicality of the encrypted image 44 might appear. In this case, an effective method is a method of detecting the encrypted positions in a way that limits the image area used for calculating the pattern cycle and the border positions to the portions exhibiting comparatively strong cyclicality.

The discussion gets back to the illustration in FIG. 21. The image inverting unit 144 executes, about the encrypted image 44, the inverting process of the converting process of the image inverting unit 32 on the basis of a method corresponding to a decryption key by use of the encrypted position information detected by the encrypted position detecting unit 143 and the decryption key inputted by a user, thereby generating a decrypted image. A procedure of the decrypting process is realized by the procedure reversed to the encrypting process, and hence its description is omitted. What has been discussed so far is the description of the first mode to which the present invention is applied.

Next, a second mode to which the present invention is applied will be described.

Figure 25:
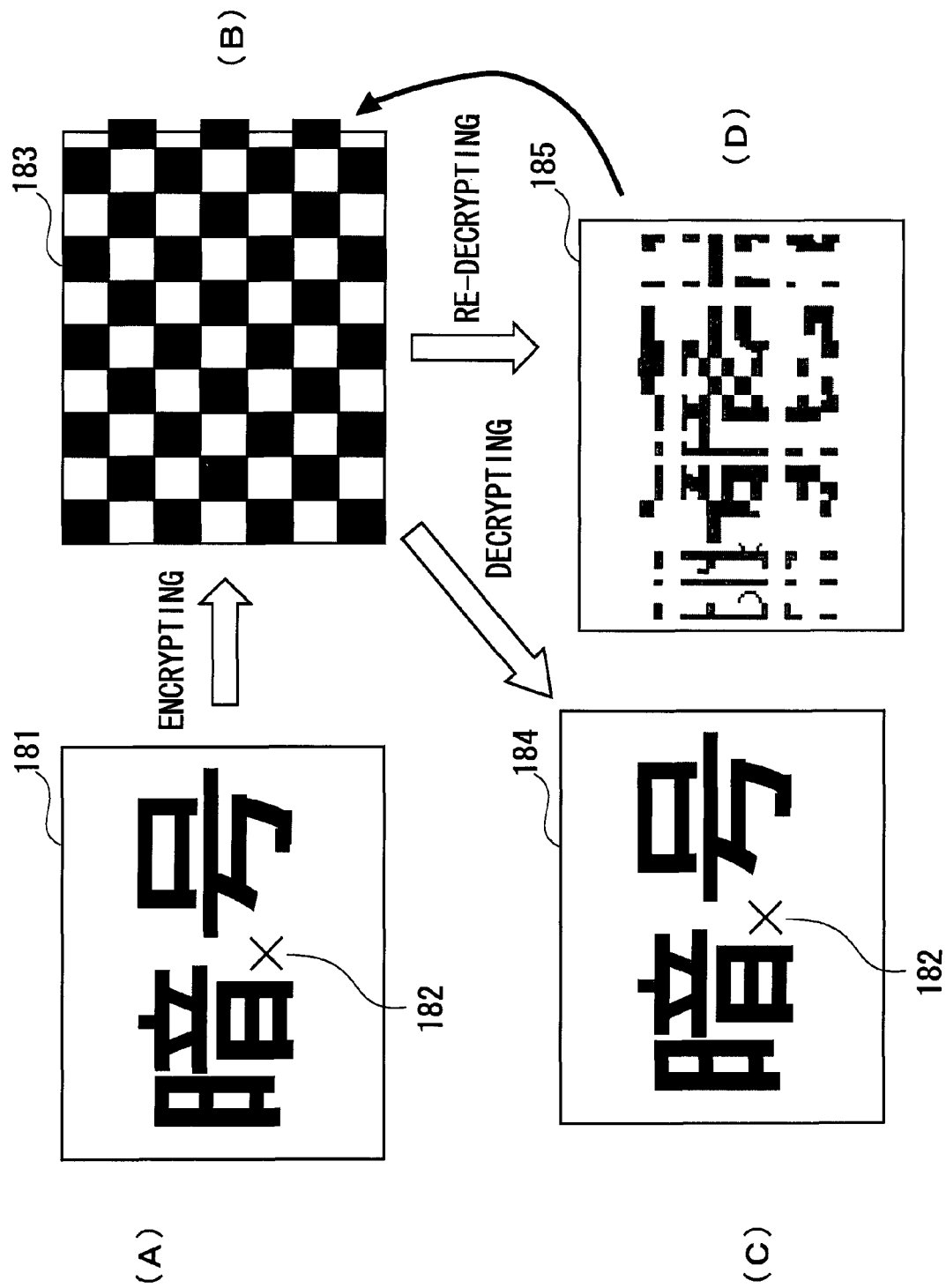
FIG. 25 is a diagram illustrating a whole image in a second mode.

FIG. 25 is a diagram showing a whole image according to the second mode. The second mode is that before the encrypting process, a specified check mark 182 for verifying validity of decrypting the encrypted image 183 ((A) in FIG. 25) is attached to an arbitrary position of an area 181 to be encrypted, then the encryption is conducted ((B) in FIG. 25), the decryption is considered to be performed correctly if the check mark 182 attached beforehand is detected from the decrypted image 184 after decrypting the encrypted image 183, and the decrypting process is terminated ((C) in FIG. 25). Whereas if the check mark 182 is not detected ((D) in FIG. 25), the encrypted position is corrected, and the decrypting process is repeated till the check mark 182 is detected or till a designated standard is satisfied.

Figure 26:
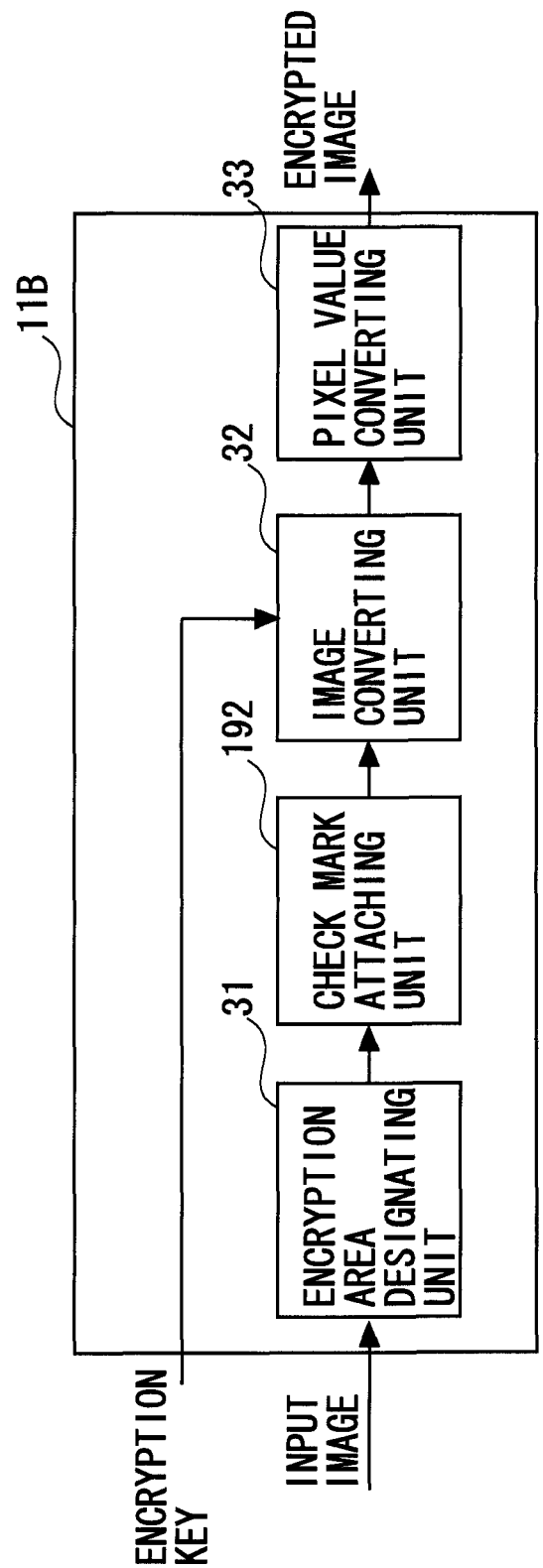
FIG. 26 is a diagram showing and outline of the encrypting process in the second mode.

FIG. 26 is a diagram illustrating an outline of the encrypting process in the second mode. In FIG. 26, the encrypting unit 11B includes the encryption area determining unit 31, a check mark attaching unit 192, the image converting unit 32 and the pixel value converting unit 33.

In the same way as in the first mode, the encryption area designating unit 31 selects the to-be-encryption area from the input image containing a want-to-encrypt area.

Then, the check mark attaching unit 192 attaches the specified check mark 182 for verifying the validity of decrypting the encrypted image 183 to the arbitrary position of the area 181 to the encrypted. The check mark 182 is, it is desirable, attached to an area having, if possible, fewer image information and a flat pixel distribution.

After attaching the check mark 182 to the designated position, in the same way as in the first mode, the image converting unit 32 inputs the area 181 to be encrypted and the encryption key, an image of the area 181 to be encrypted is visually converted by the converting method corresponding to the encryption key, and the pixel value converting unit 33 converts at the fixed intervals the pixels within the processed image converted by the image converting unit 32, thus making the converted image take substantially the grating-shaped stripped pattern.

Figure 27:
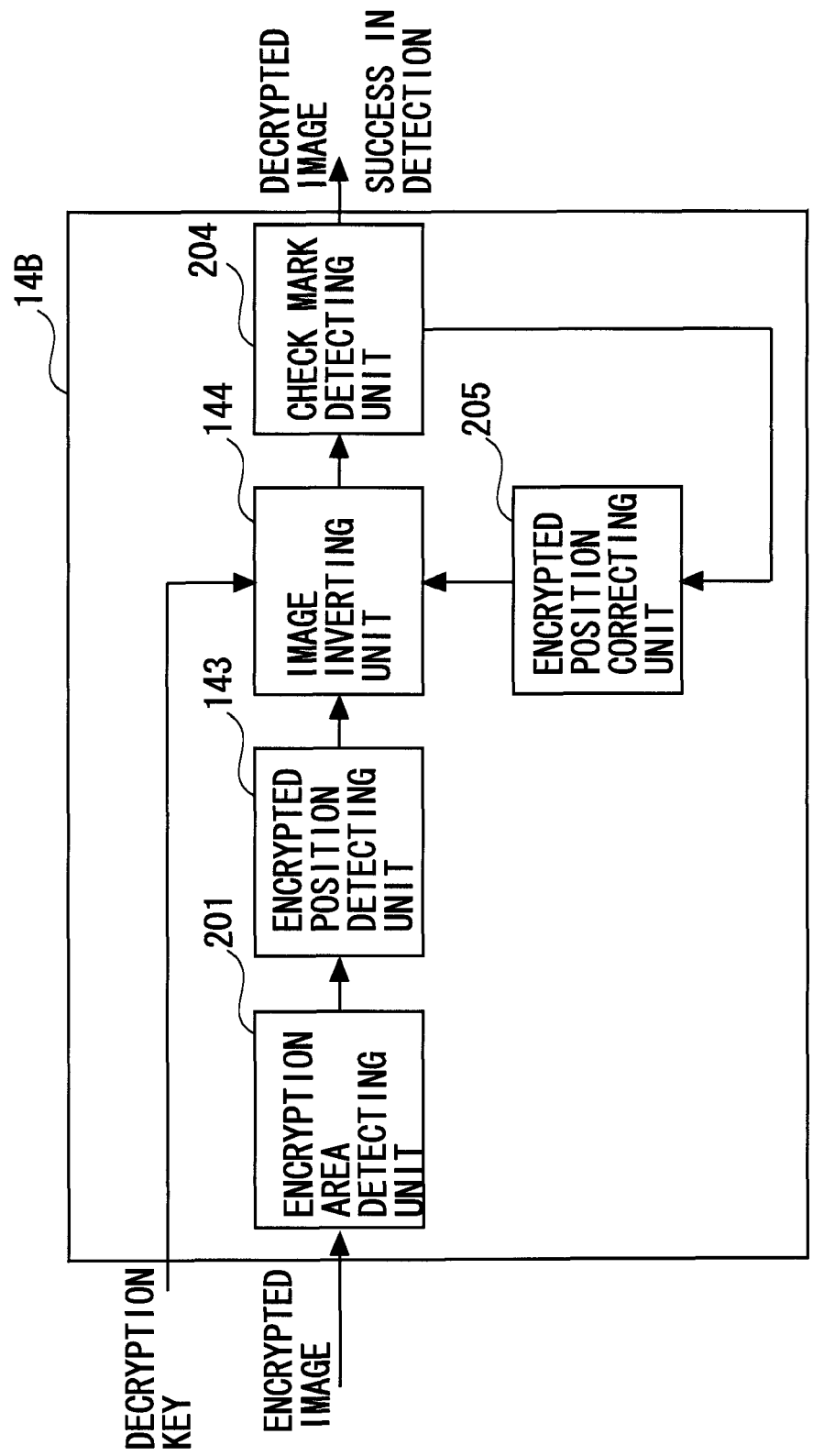
FIG. 27 is a diagram showing an outline of the decrypting process in the second mode.

FIG. 27 is a diagram showing an outline of the decrypting process in the second mode. In FIG. 27, the decrypting unit 14B includes an encryption area detecting unit 201, an encrypted position detecting unit 143, an image inverting unit 144, a check mark detecting unit 204 and an encrypted position correcting unit 205.

To start with, the encryption area detecting unit 201 detects a rough area of the encrypted image 183. Through the encrypting process by the encrypting unit 11B, a pixel distribution of the encrypted image 183 takes roughly a checkered pattern, and therefore, if the frequency analysis such as FFT is conducted about the horizontal and vertical directions thereof, power of a frequency corresponding to a stripe cycle becomes conspicuously strong.

Figure 28:
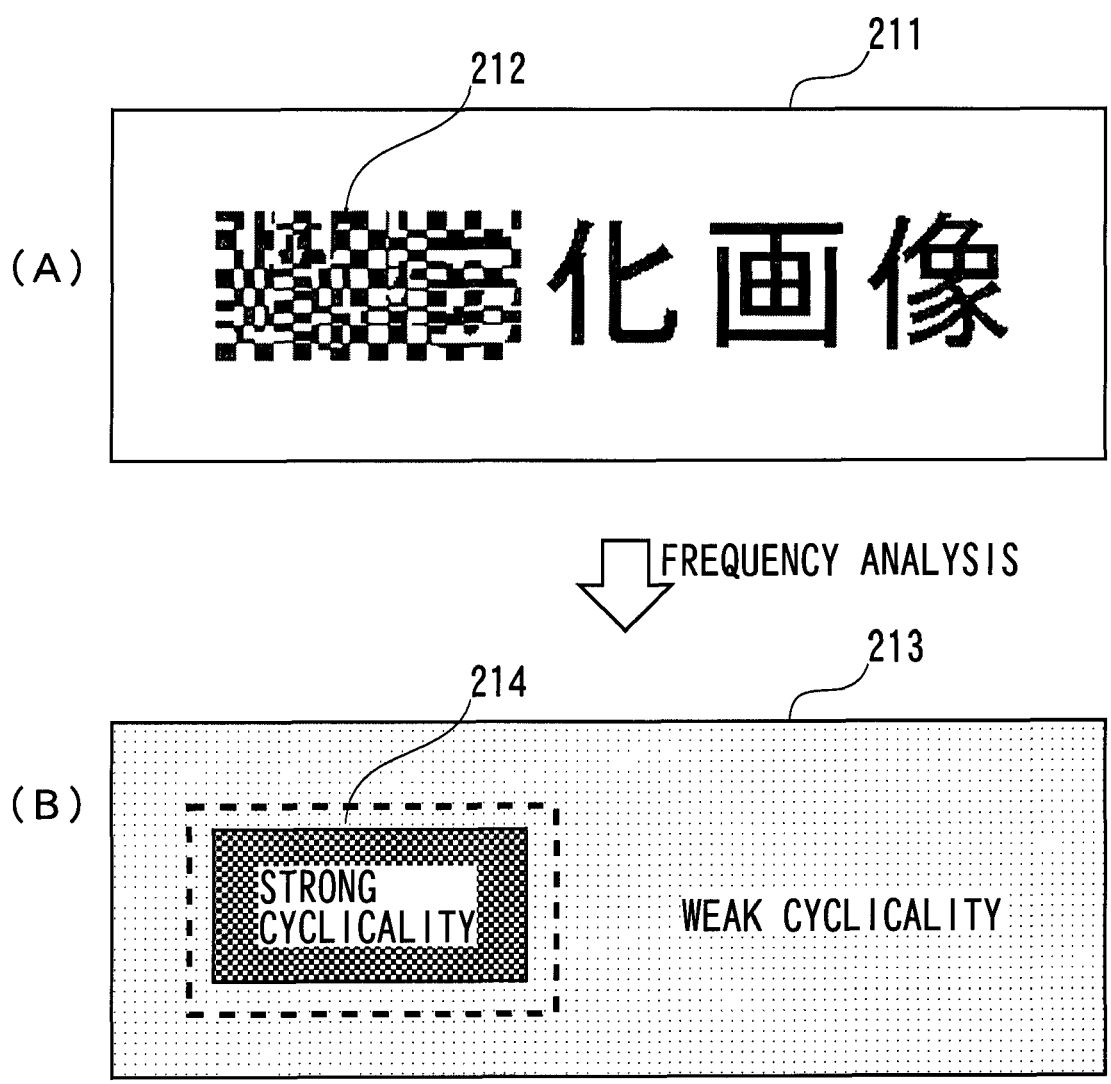
FIG. 28 is an explanatory diagram of an encryption area detecting method.

FIG. 28 is an explanatory diagram of a method of detecting the encryption area. As illustrated in (A) of FIG. 28, when performing the frequency analysis about an encrypted image 211, as shown in (B), a power intensive area of a certain frequency is expressed as a [strong cyclicality] 214 (a frequency of an integral multiple of the former frequency). The cyclicality of the pixel distribution within the encryption area tends to be strong, and it is therefore feasible to detect a rough encryption area and a stripped pattern cycle.

The discussion gets back to the illustration in FIG. 27. The encrypted position detecting unit 143, after the encryption area detecting unit 201 has specified a rough encryption area, detects the encryption area more precisely, and simultaneously the minute positions of the respective pixels in the encryption area. Such a method can be considered as one example of the positional detection that the border position (offset) of the pixel-value conversion is obtained from the stripped pattern cycle acquired by the encryption area detecting unit 201 and from an absolute pixel value difference distribution, and the areas exhibiting a comparatively large absolute pixel value difference are further narrowed down therefrom. Moreover, in the same way as by the encrypted position detecting unit 143 in the first mode, the detection of the encrypted position can involve using the Hough transform.

Figure 29:
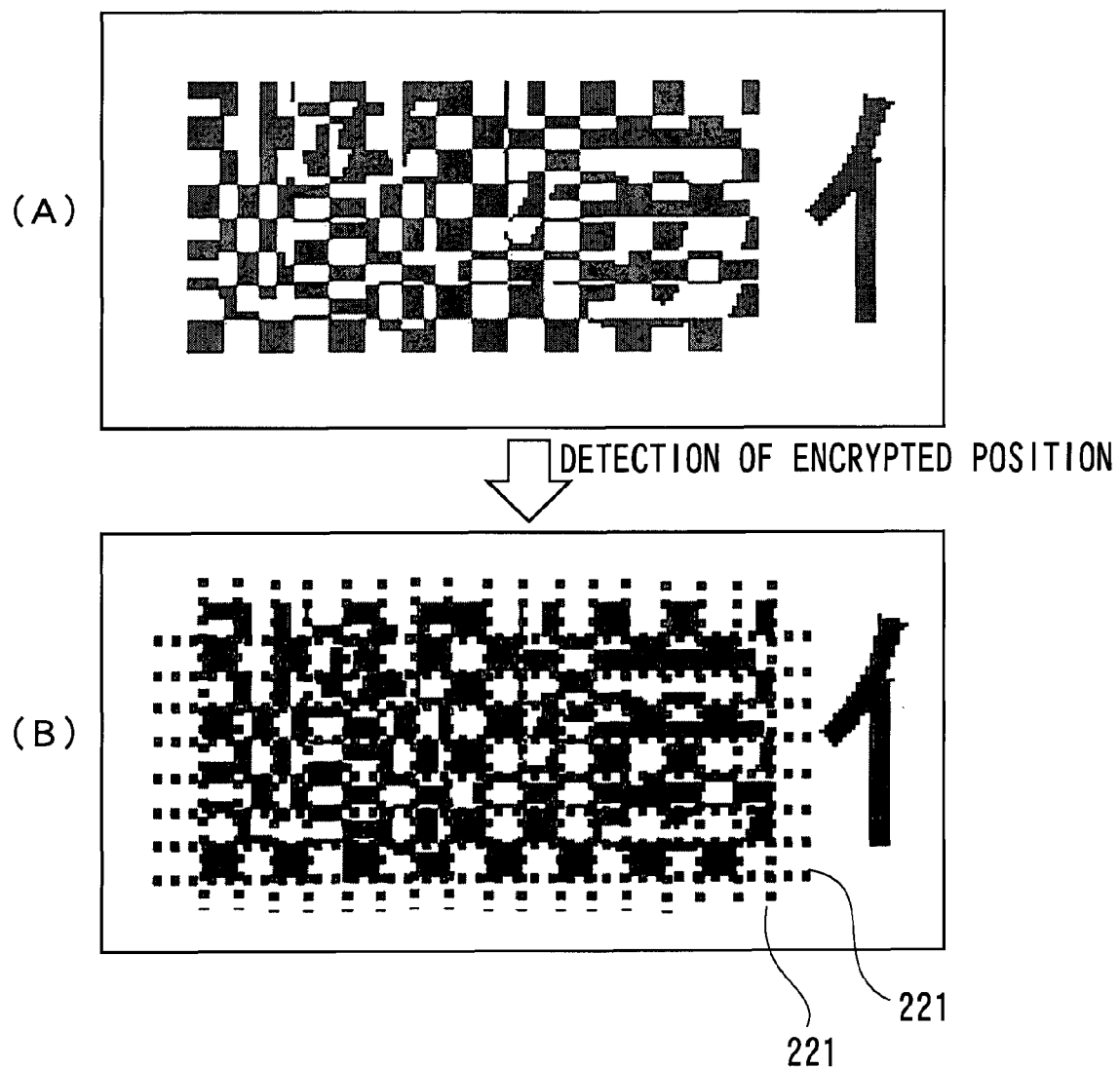
FIG. 29 is an explanatory diagram of a method of detecting an encrypted position (in a horizontal direction).

FIG. 29 is an explanatory diagram of the method of detecting the encrypted position (in the horizontal direction). As stated above, when the encryption area detecting process described above is conducted respectively in the horizontal direction and in the vertical direction, as illustrated in FIG. 29, an encrypted position 221 is detected.

The discussion gets back to the illustration in FIG. 27. The image inverting unit 144 generates a decrypted image by executing the same method as in the first mode in a way that employs the information on the encrypted position and a decryption key.

The check mark detecting unit 204 tries to detect the check mark from the decrypted image decrypted by the image inverting unit 144. The detecting method is the same as the marker detecting process in the first mode, and hence its explanation is omitted. Then, when the check mark is detected, the decrypted image is output, and the process is terminated. When the check mark is not detected, the encrypted position correcting unit 205 corrects the encrypted position, and, till the check mark is detected or till a designated standard is satisfied, the decrypting process (image inverting process) is redone.

Figure 30:
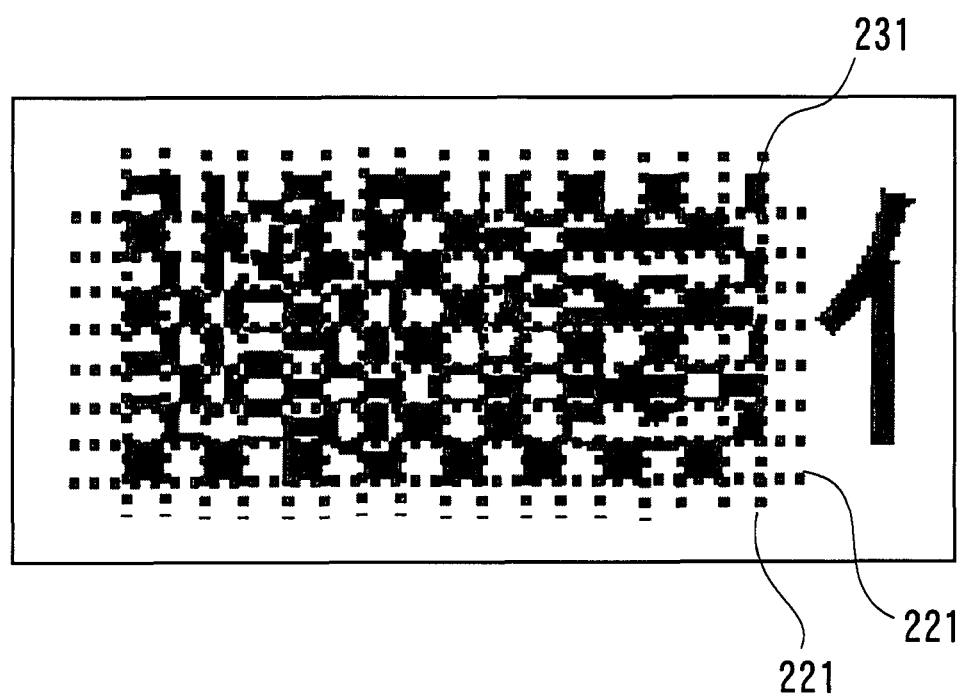
FIG. 30 is a diagram showing an example of mis-detecting the encrypted position.

FIG. 30 is a diagram showing an example of how the encrypted position is mis-detected. As illustrated in FIG. 30, there is considered a case in which an edge of the encrypted image is overlooked (a fail-in-detection line 231). Such being the case, when failing to detect the check mark 221, lines representing the encrypted position are added to or deleted from the left right edge and the upper lower edge, and the image inverting process is executed, thus examining in various ways whether the check mark 221 is detected or not. If the check mark 221 can not be detected by adding or deleting the lines in whatever manner, the process is ended without outputting the decrypted image. What has been discussed so far is the description about the second mode to which the present invention is applied.

Next, a third mode to which the present invention is applied will be described. The third mode of the present invention entails encrypting the image and decrypting the encrypted image by use of both of the positioning marker for specifying the encryption area that is exemplified in the first mode and the check mark for determining the validity of the decrypted image in the second mode. An image decryption error caused when the valid decryption key is inputted can be reduced by use of the two types of markers such as the position marker for the positional detection and the check mark for checking the decrypted image.

Figure 31:
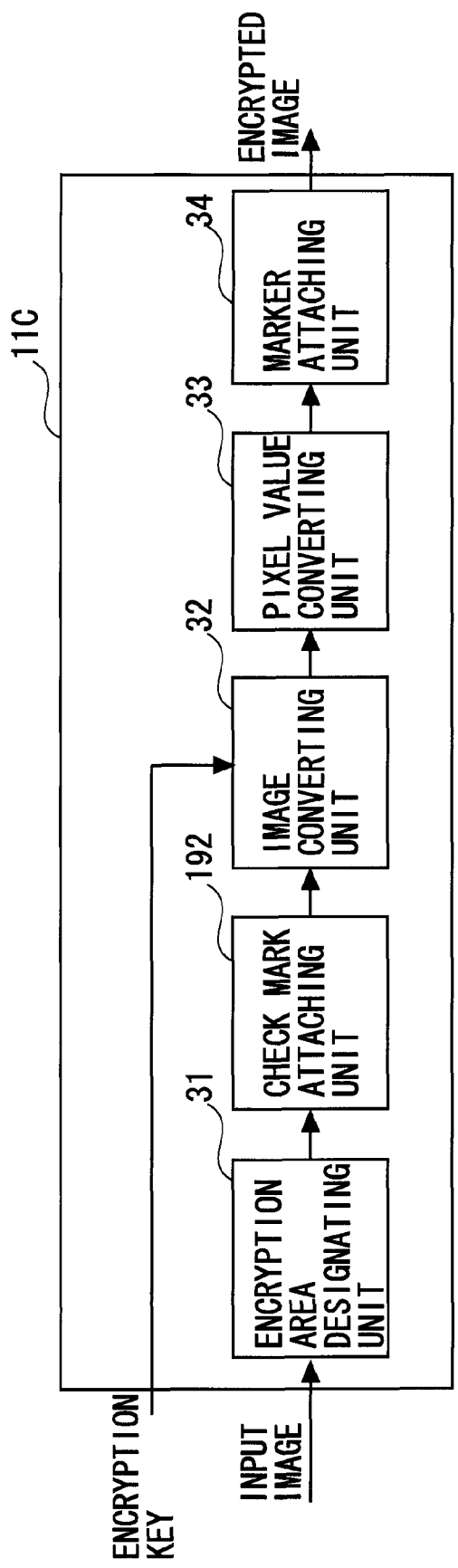
FIG. 31 is a diagram showing an outline of the encrypting process in a third mode.

FIG. 31 is a diagram showing an outline of the encrypting process in the third mode. In FIG. 31, the encrypting unit 11C includes the encryption area determining unit 31, a check mark attaching unit 192, the image converting unit 32, the pixel value converting unit 33 and the marker attaching unit 34.

To begin with, the encryption area determining unit 31 selects the image area to be encrypted, and the check mark attaching unit 192 attaches the check mark for verifying the decryption by the same method as in the second mode. After attaching the check mark, the image converting unit 32 and the pixel value converting unit 33 encrypt the image by executing the image process by the same method as in the first and second modes, and the marker attaching unit 34 attaches the positioning marker for detecting the encryption area by the same method as in the first mode. The contents of the respective processes are the same as those in the first or second mode, and hence their explanations are omitted.

Figure 32:
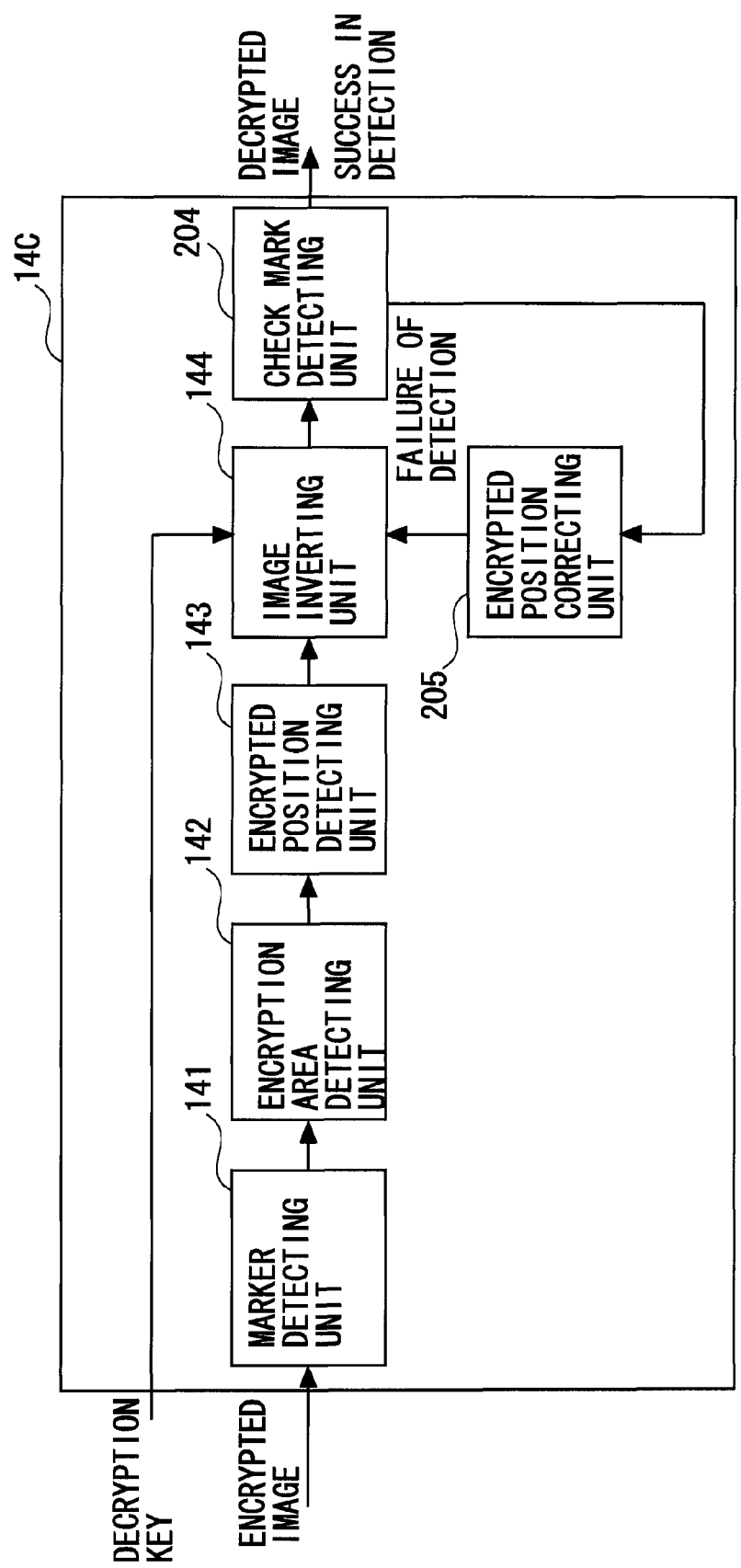
FIG. 32 is a diagram showing an outline of the decrypting process in the third mode.

FIG. 32 is a diagram showing an outline of the decrypting process in the third mode. In FIG. 32, the decrypting unit 14C includes the marker detecting unit 141, the encryption area detecting unit 142, the encrypted position detecting unit 143, the image inverting unit 144, the check mark detecting unit 204 and the encrypted position correcting unit 205.

At first, the marker detecting unit 141 detects the positioning marker by the same method as in the first mode, and subsequently the encryption area detecting unit 142 detects the encryption area by the same method as in the first mode. Moreover, the encrypted position detecting unit 143 detects the minute positions of the respective pixels in the encryption area by the same method as in the first mode. Furthermore, the respective processing procedures executed by the check mark detecting unit 204 and the encrypted position correcting unit 205 are the same as those in the second mode, and hence their explanations are omitted. What has been discussed so far is the description about the third mode to which the present invention is applied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An information output system for tampering detection of a paper medium, comprising:
    a hardware processor and a computer-readable storage, the processor configured to:
    acquire a digital image including target information for tampering detection as an image, and record the digital image in the storage;
    encrypt, which involves converting the digital image including target information for tampering detection based on an encryption key to generate an encrypted image, and record the encrypted image in the storage;
    output the encrypted image of the entire target information generated by the encrypting and record the encrypted image on the paper medium on which the image of the target information is to be recorded or on which the image of the target information is recorded; and
    output, simultaneously with the output of the encrypted image generated by converting the digital image including the entire target information, the unencrypted image of the entire target information as a target of tampering detection and record the unencrypted image on the paper medium in addition to the encrypted image.

2. An information output system for tampering detection according to claim 1, wherein:
    the target information outputting involves outputting the image of the target information and recording the image of the target information on one side of the paper medium; and
    the encrypted image outputting involves outputting the encrypted image and recording the encrypted image on another side of the paper medium.

3. An information output system for tampering detection according to claim 1, said processor further configured to receive input of electronic data including the target information, wherein:
    the digital image acquiring involves generating the digital image based on the electronic data to acquire the digital image; and
    the target information outputting involves outputting the digital image as the image of the target information recorded on the paper medium.

4. An information output system for tampering detection according to claim 1, wherein:
    the encrypting involves converting an image of at least a partial area of the digital image based on the encryption key to a processed image and regularly converting a pixel value of the processed image to generate a converted image having regularity used in specifying a position of the partial area in decryption and generate the encrypted image including the converted image.

5. An information output method for tampering detection of a paper medium for causing a processor to execute:
    acquiring a digital image including target information for tampering detection as an image, and recording the digital image in a computer-readable storage;
    encrypting, which involves converting the digital image including target information for tampering detection based on an encryption key to generate an encrypted image, and recording the encrypted image in the storage;
    outputting the encrypted image including the entire target information generated in the encrypting so that the encrypted image is recorded on the paper medium on which the image of the target information is to be recorded or on which the image of the target information is recorded; and
    outputting, simultaneously with the output of the encrypted image generated by converting the digital image including the entire target information, the unencrypted image of the entire target information as a target of tampering detection and record the unencrypted image on the paper medium in addition to the encrypted image.

6. A non-transitory computer-readable storage medium recorded with an information output program for tampering detection of a paper medium that when executed by a processor causes a computer to perform the steps of:
    acquiring a digital image including target information for tampering detection as an image, and recording the digital image in storage;
    converting the digital image including target information for tampering detection based on an encryption key to generate an encrypted image, and recording the encrypted image in storage;
    outputting the encrypted image of the entire target information generated by the converting so that the encrypted image is recorded on the paper medium on which the image of the target information is to be recorded or on which the image of the target information is recorded; and
    outputting, simultaneously with the output of the encrypted image generated by converting the digital image including the entire target information, the unencrypted image of the entire target information as a target of tampering detection and recording the unencrypted image on the paper medium in addition to the encrypted image.

* * * * *